(12) United States Patent
Dames

(10) Patent No.: US 11,502,436 B2
(45) Date of Patent: Nov. 15, 2022

(54) ELECTRICAL CONNECTION FOR TRANSFERRING SIGNALS WHILE REDUCING INTERFERENCE

(71) Applicant: SENTEC LTD, Cambridge (GB)

(72) Inventor: Andrew Dames, Cambridge (GB)

(73) Assignee: SENTEC LTD, Cambridge (GB)

( * ) Notice: Subject to any disclaimer, the term of this patent is extended or adjusted under 35 U.S.C. 154(b) by 0 days.

(21) Appl. No.: 17/413,178

(22) PCT Filed: Dec. 10, 2019

(86) PCT No.: PCT/GB2019/053493
§ 371 (c)(1),
(2) Date: Jun. 11, 2021

(87) PCT Pub. No.: WO2020/120950
PCT Pub. Date: Jun. 18, 2020

(65) Prior Publication Data
US 2022/0052472 A1 Feb. 17, 2022

(30) Foreign Application Priority Data

Dec. 11, 2018 (GB) .................................... 1820125

(51) Int. Cl.
*H01R 12/77* (2011.01)
*H04B 3/28* (2006.01)

(52) U.S. Cl.
CPC ............. *H01R 12/775* (2013.01); *H04B 3/28* (2013.01)

(58) Field of Classification Search
CPC ........... H01R 12/775; H04B 3/30; H04B 3/28
See application file for complete search history.

(56) References Cited

U.S. PATENT DOCUMENTS

| 4,185,162 A | 1/1980 | Bogese, II |
| 6,265,655 B1 | 7/2001 | Schweighofer |

(Continued)

FOREIGN PATENT DOCUMENTS

| JP | 60170336 A | 9/1985 |
| JP | 5867022 B2 * | 2/2016 |

OTHER PUBLICATIONS

International Search Report and Written Opinion from related international application PCT/GB2019/053493, dated Mar. 17, 2020, all pages cited in its entirety.

*Primary Examiner* — Jean F Duverne
(74) *Attorney, Agent, or Firm* — Burr & Forman LLP

(57) ABSTRACT

Apparatus (2) is described including one or more signal sources (6). The apparatus (2) also includes a measurement front end (7) having at least first (+$V_{in}$)) and second (−$V_{in}$) inputs. The apparatus (2) also includes a substantially planar connector (1) having a length (L) between first (1a) and second (1b) ends and supporting a number of conductors (3) spanning between the first (1a) and second (1b) ends. At each point between the first (1a) and second (1b) ends the conductors (3) are substantially equi-spaced from one another within the substantially planar connector (1). The conductors (3) include at least one signal conductor (8) connecting the signal sources (6) to the first input (+$V_{in}$). The conductors (3) also include at least two further conductors (10, 11) connecting to the one or more signal sources (6). One or both of the two further conductors (10, 11) also connect to the second input (−$V_{in}$). Each of the at least one signal conductor (8) and the at least two further conductors (10, 11) belongs to one or more closed loops. The one or more closed loops have areas and impedances configured such that in response to a uniform time-varying external magnetic field being applied to the apparatus, a first unwanted electromotive force induced at the first input (Continued)

($+V_{in}$) will be substantially equal to a second unwanted electromotive force induced at the second input ($-V_{in}$).

20 Claims, 11 Drawing Sheets

(56) References Cited

U.S. PATENT DOCUMENTS

2001/0027534 A1* 10/2001 Sato ................ G06K 15/102
  713/501
2011/0228284 A1* 9/2011 Ohmine ............ G06K 15/1894
  327/156

* cited by examiner

ELECTRICAL CONNECTION FOR TRANSFERRING SIGNALS WHILE REDUCING INTERFERENCE

TECHNICAL FIELD

The present invention relates to connectors for transferring signals whilst reducing or removing interference from time varying electromagnetic fields.

BACKGROUND

In many applications it is desired or required to convey a small signal from one point to another, whilst minimising the effects of interference on the conveyed signal. The interference may sometimes be viewed as including magnetic and electrostatic components. One example of such an application is an electricity meter, in which the current sensing element may typically be required to work to a high accuracy (<0.2%) over a wide dynamic range (1000:1 current). The minimum signals which it is desired to detect from the current sensing element may be quite small (for example of the order of 1 µV). For example, the signal may be small as the sensor may be a shunt with a low resistance to minimise voltage drop and so heating, or to minimise the required number of turns on a dI/dt type sensor. These levels of sensitivity may require interference levels to be of the order 10 nV at line frequency (for example mains frequency) in order to give the required accuracy at the low current end of measurements. Electricity meters are deployed in close proximity to one or more conductors, for example the cables connected directly or indirectly to the meter and possibly adjacent busbars in the meter. In addition in some instances additional current carrying conductors which are not being monitored by the meter may be present. For example, an electricity meter for a supply to a flat/apartment may be installed in close proximity to meters and supplies for other flats/apartments in the same building. In this and analogous installations, an electricity meter must still be accurate in the presence of the nearby conductors carrying significant currents at line frequency (which generate significant potentially interfering magnetic fields), and also the phase to phase line voltage (generating significant potentially interfering electric fields). Consequently, good performance is needed both for rejecting electromotive forces (EMFs) induced by time varying magnetic fields and for rejecting capacitively coupled potentials.

Approaches for reducing the interference from external electrical and time-varying magnetic fields have included using connecting wires which are twisted or braided together, co-axial cables, and star-quad cables.

SUMMARY

According to a first aspect of the present invention there is provided apparatus including one or more signal sources. The apparatus also includes a measurement front end having at least first and second inputs. The apparatus also includes a substantially planar connector having a length between first and second ends and supporting a number of conductors spanning between the first and second ends. At each point between the first and second ends the conductors are substantially equi-spaced from one another within the substantially planar connector. The conductors include at least one signal conductor connecting the signal sources to the first input. The conductors also include at least two further conductors connecting to the one or more signal sources. One or both of the two further conductors also connect to the second input. Each of the at least one signal conductor and the at least two further conductors belongs to one or more closed loops. The one or more closed loops have areas and impedances configured such that in response to a uniform time-varying external magnetic field being applied to the apparatus, a first unwanted electromotive force induced at the first input will be substantially equal to a second unwanted electromotive force induced at the second input.

The at least one signal conductor may connect the signal sources to the first input directly or indirectly. The at least two further conductors may connect directly or indirectly to the one or more signal sources. One or both of the two further conductors may connect to the second input directly or indirectly. Substantially planar may mean that an extent (length, width) of the substantially planar connector in first and second non-parallel directions is at least five times a thickness of the substantially planar connector. A substantially planar connector may take the form of a flat flexible cable (FFC), a ribbon cable, a flexible or rigid substrate supporting the conductors. A substantially planar conductor is considered to remain substantially planar even when bent, folded, deformed or otherwise routed in three-dimensions. For example, an FFC is substantially planar even when bent, folded, twisted, rolled or otherwise configured, so that an FFC which joins any two points together is a substantially planar connector.

When laid on a flat horizontal surface, the conductors of a substantially planar connector may all lie within a vertical distance of a common plane which is less than or equal to 0.5 mm, less than or equal to 0.1 mm, less than or equal to 0.05 mm or less than or equal to 0.01 mm.

Conductors may be substantially equi-spaced from one another if the separation between any pair of adjacent conductors is less than 15% of an average spacing between conductors, less than 10% of the average spacing, less than 5% of the average spacing, or less than 1% of the average spacing.

The first and second unwanted electromotive forces may correspond to induced potentials which are generated in addition to the one or more signal sources. Such additional induced potentials may, unless cancelled, register as noise or false signals superposed on the signal sources. In other words, the first and second unwanted electromotive forces may correspond to induced potentials resulting primarily from the conductors of the substantially planar connector and/or connections between the conductors and the signal source(s) and/or the first and second inputs. The first unwanted electromotive force may be substantially equal to the second unwanted electromotive force when a difference between the first and second unwanted electromotive forces is less than 15%, less than 10%, less than 8%, less than 5%, less than 1% or less than 0.5% of the larger of the first and second unwanted electromotive forces.

The measurement front end may perform a differential measurement between the first and second inputs. In this way, the substantially equal first and second unwanted electromotive forces may register as a common-mode potential which may be rejected by the differential measurement of the measurement front end.

One or more conductors other than the at least one signal conductor and the at least two further conductors may be used for transmitting one or more digital and/or analogue signals not originating from the one or more signal sources.

The apparatus and/or the substantially planar connector may also include an electrostatic shield layer configured to shield the at least one signal conductor and the at least two further conductors from coupling to electric fields originating outside the substantially planar connector.

The electrostatic shield layer may be configured to shield the plurality of conductors from coupling to electric fields originating outside the substantially planar connector.

The electrostatic shield layer may be grounded using one of the plurality of conductors.

The electrostatic shield layer may be grounded using one of the at least two further conductors.

At least a portion of the substantially planar connector may be flexible.

The substantially planar connector may take the form of a flexible flat cable (FFC). The substantially planar connector may take the form of a ribbon cable. The substantially planar connector may take the form of a plurality of tracks supported on a rigid or flexible substrate. The substantially planar connector may take the form of a plurality of tracks sandwiched between a pair of rigid or flexible substrates.

The at least one signal conductor and the at least two further conductors may at least partly define two or more closed loops, wherein at least one of the closed loops includes one of the signal sources.

At least one closed loop of the one or more closed loops may cross itself to form two or more sub-loops.

A closed loop which crosses itself does so geometrically and/or topologically, but not electrically. In other words, a closed loop which crosses itself is not shorted at the crossing. The direction of one or more sub-loops may be different to one or more other sub-loops. The at least one signal conductor and the at least two further conductors may form a single closed loop which crosses itself to form two sub-loops having substantially equal areas and opposed directions. Closed loops or sub-loops may have opposed directions when electromotive forces induced in those closed loops or sub-loops in response to a uniform time-varying magnetic field will have opposite signs.

The apparatus may also include one or more resistances, each resistance connected in series with one of the at least one signal conductor and the at least two further conductors. Each resistance of the one or more resistances may be configured to adjust the relative impedances of corresponding closed loop or loops which include that resistance.

The resistances of the one or more resistances may be larger than the resistances of the corresponding conductors.

The one or more closed loops may have areas and impedances further configured such that in response to a time-varying external magnetic field with uniform spatial gradient being applied to the apparatus, a first unwanted electromotive force induced at the first input will be substantially equal to a second unwanted electromotive force induced at the second input.

The one or more loops may have areas and impedances further configured such that in response to a quadratic (spatial gradient) time-varying external magnetic field having a magnitude varying quadratically with spatial coordinates being applied to the apparatus, a first unwanted electromotive force induced at the first input will be substantially equal to a second unwanted electromotive force induced at the second input.

One or more conductors of the plurality of conductors which bracket the at least one signal conductor and the at least two further conductors may be connected to a ground or reference potential.

The cancellation of electromotive forces may be maintained when the substantially planar connector is twisted, folded, bent and/or otherwise deformed.

The one of or more closed loops may include at least one closed loop which does not include any signal sources.

The one or more signal sources may include at least one current sensor.

The one or more signal sources may include at least one microphone.

The one or more signal sources may include at least one ultrasonic transducer.

The one or more signal sources may include at least one pick-up coil.

The signal source may be a signal output of a digital or analogue circuit. The signal source may be a digital signal output. The signal source may be an analogue signal output.

The one or more signal sources may include a signal source having first and second terminals. The at least one signal conductor and the at least two further conductors may include a first signal conductor connecting the first input to the first terminal. The at least one signal conductor and the at least two further conductors may also include second and third signal conductors, both connecting the second input to the second terminal. The first signal conductor may be between the second and third signal conductors.

The first input may be connected directly or indirectly to a ground or reference potential. The second input may be connected directly or indirectly to a ground or reference potential.

The at least one signal conductor and the at least two further conductors may also include a fourth signal conductor connecting the first input to the first terminal. The fourth signal conductor may be arranged between the second and third signal conductors. The fourth signal conductor may connect the first input to the first terminal directly or indirectly.

The one or more signal sources may include first and second balanced signal sources, each having a positive terminal and a negative terminal. The at least one signal conductor and the at least two further conductors may include a fifth signal conductor connecting the first input to the positive terminal of the first balanced signal source, a sixth signal conductor connecting the negative terminal of the first balanced signal source to a ground or reference potential, a seventh signal conductor connecting the second input to the negative terminal of the second balanced signal source, and an eighth signal conductor connecting the positive terminal of the second balanced signal source to a ground or reference potential. The fifth to eighth signal conductors may belong to a single crossed closed loop.

The fifth signal conductor may connect the first input to the positive terminal of the first balanced signal source directly or indirectly. The sixth signal conductor may connect the negative terminal of the first balanced signal source to a ground or reference potential directly or indirectly. The seventh signal conductor may connect the second input to the negative terminal of the second balanced signal source directly or indirectly. The eighth signal conductor may connect the positive terminal of the second balanced signal source to a ground or reference potential directly or indirectly.

The one or more signal sources may include a first signal source having a positive terminal and a negative terminal. The at least one signal conductor and the at least two further conductors may include ninth and tenth signal conductors connecting to the positive terminal, and eleventh and twelfth signal conductors connecting to the negative terminal. The ninth and tenth signal conductors may be interleaved with the eleventh and twelfth signal conductors. A first weight may be applied to signals from the ninth and eleventh signal conductors and a second weight may be applied to signals from the tenth and twelfth signal conductors.

The ninth signal conductor may connect to the positive terminal directly or indirectly. The tenth signal conductor may connect to the positive terminal directly or indirectly. The eleventh signal conductor may connect to the negative terminal directly or indirectly. The twelfth signal conductor may connect to the negative terminal directly or indirectly.

The tenth signal conductor may be between the eleventh and twelfth signal conductors. The eleventh signal conductor may be between the ninth and tenth signal conductors.

The ninth and tenth signal conductors may be connected to the first input. The eleventh and twelfth signal conductors may be connected to the second input. The first and second weights may be applied using resistances connected between the signal conductors and the respective inputs.

The first and second inputs may correspond to a first output. The measurement front end may also include third and fourth inputs corresponding to a second output. The ninth signal conductor may connect to the first input. The eleventh signal conductor may connect to the second input. The tenth signal conductor may connect to the third input. The twelfth signal conductor may connect to the fourth input. The apparatus may be configured to calculate a weighted sum of the first and second outputs using the first and second weights respectively.

The ninth signal conductor may connect to the first input directly or indirectly. The eleventh signal conductor may connect to the second input directly or indirectly. The tenth signal conductor may connect to the third input directly or indirectly. The twelfth signal conductor may connect to the fourth input directly or indirectly.

The apparatus may also include one of more insulation layers applied to the outside of the substantially planar connector to provide additional isolation and stiffness. The insulation layer(s) may include or take the form of a heat shrink material. The substantially planar connector may be pre-formed or bent prior to installation in the apparatus.

The apparatus may be configured to route the substantially planar connector away from any expected regions of time-varying magnetic field. The apparatus may be configured to maintain the substantially planar connector substantially within a single plane, in other words to maximise the flatness of the substantially planar connector in the apparatus. Routing of the substantially planar connector within the apparatus may be defined using geometric features or structures of the apparatus, for example a casing or a cable guide. Suitable clips, ties or other fastening means may be provided in order to secure the substantially planar connector in place relative to the apparatus.

According to a second aspect of the invention, there is provided use of the apparatus according to the first aspect for obtaining measurements of a signal source.

According to a third aspect of the invention, there is provided apparatus including a signal source having first and second terminals, and a signal receiver or load having first and second inputs. The apparatus also includes a substantially planar connector having a length between first and second ends and supporting a number of conductors spanning between the first and second ends. At each point between the first and second ends the conductors are substantially equi-spaced from one another within the substantially planar connector. The conductors include a first signal conductor connecting the first terminal to the first input. The conductors also include second and third signal conductors, both connecting the second terminal to the second input. Each of the first, second and third signal conductors belong to one or more closed loops. The one or more closed loops have areas and impedances configured such that in response to a uniform time-varying external magnetic field being applied to the apparatus, a first unwanted electromotive force induced at the first input will be substantially equal to a second unwanted electromotive force induced at the second input.

The first signal conductor may connect the first terminal to the first input directly or indirectly. The second signal conductor may connect the second terminal to the second input directly or indirectly. The third signal conductor may connect the second terminal to the second input directly or indirectly.

Balancing of induced electromotive forces in response to an external time-varying magnetic field corresponds to balancing of time-varying magnetic fields generated by the first, second and third signal conductors when a signal is transmitted from the signal source to the signal receiver. In this way, magnetic emissions from the substantially planar connector may be reduced.

One or more conductors other than the first, second and third signal conductors may be used for transmitting one or more digital and/or analogue signals not originating from the signal source, and/or to connect one or more signal sources to a measurement front end as described in relation to the first aspect.

The apparatus according to the second aspect may include features corresponding to any features of the first aspect of the invention.

According to a fourth aspect of the invention, there is provided a substantially planar connector having a length between first and second ends and supporting a plurality of conductors spanning between the first and second ends. At each point between the first and second ends the conductors are substantially equi-spaced from one another within the substantially planar connector. A first end region corresponds to a region extending from the first end for 10% of the length. A second end region corresponds to a region extending from the second end for 10% of the length. At least a pair of the conductors are electrically connected within one or both of the first end region and the second end region.

The substantially planar connector may include features corresponding to any features of the first and/or second aspects of the invention.

The at least one pair of conductors may be electrically connected at one or both of the first end and the second end.

The substantially planar connector may include, or take the form of, a flat flexible cable, a ribbon cable or a flexible printed circuit substrate.

According to a fifth aspect of the invention, there is provided use of three or more conductors to transfer an electrical signal along a flat flexible cable.

The measured electrical signal may be immune to interference from uniform alternating current (AC) magnetic fields that the cable passes through.

The measured electrical signal may also be immune to linear gradient fields.

The measured electrical signal may also be immune to quadratic gradient fields.

The measured electrical signal may also be immune to interference from uniform alternating current (AC) electric fields that the cable passes through.

The immunity may be maintained under typical cable twisting.

A conductive loop may be formed by the cable, not including the signal source.

Multiple analogue-to-digital convertor (ADC) channels may be used to measure signal from the same source.

Resistor dividers may be used to recover the signal.

Shorting conductors may be used to recover the signal from electromagnetic interference in the cable.

The signal source may be a current sensor.

The signal source may be a microphone.

The signal source may be an ultrasonic transducer.

The aspects described herein may be used in any application employing flexible flat cable (FFC). The aspects described herein may be used in any application employing coaxial cable. The aspects described herein may be used in any application employing cable loom. The aspects described herein may be used in any application employing twisted wires and/or twisted cables. The aspects described herein may be used in any application involving equipment and/or systems generating, or located within, high magnetic field environments whilst also requiring transference of sensitive signals.

The aspects described herein may be used in laptops, magnetic resonance imaging (MRI) equipment, fusion equipment, sensors located in close proximity to a motor, in electric meters, in switches or relays, in mass spectrometer equipment, in particle accelerators, in laboratory equipment, and so forth. The aspects described herein may be used in audio equipment such as speakers, loud speakers, microphones, mixing desks, musical instruments and so forth.

Many sensors produce low level signals that need connecting to electronics within systems. Such signals need protecting from corruption from magnetic and electrostatic interference, especially on their way to the initial conditioning electronics. Linear format connectors such as flat flexible cables (eg FFC) are very common low cost parts these days. The aspects described herein embody techniques for using these standard connector formats to transfer signals between different places with excellent rejection of magnetic and electrostatic interference.

BRIEF DESCRIPTION OF THE DRAWINGS

Certain embodiments of the present invention will now be described, by way of example, with reference to the accompanying drawings, in which.

DETAILED DESCRIPTION OF CERTAIN EMBODIMENTS

This specification relates to the field of apparatuses for connecting signal sources to a measurement front end, in order to permit measurements of the signal source(s) in which interference from time varying magnetic fields is reduced or removed. Many examples according to this specification also have, or may also have, reduced or removed interference from electrical fields.

In some cases, applications requiring good rejection of interference from magnetic and electric fields may relate to high volume parts. Returning to the example of electricity meters, which are high volume parts, such interference performance is preferably provided using low cost and straight-forward components and manufacturing techniques.

One approach to controlling magnetic coupling is to support signal sources and corresponding measurement electronics close together on the same printed circuit board (PCB). However, sometimes this is not possible, and a wired/cabled connection is needed. This may often be accomplished using twisted wires, for example a twisted pair. The use of twisted wires may introduce significant uncertainties as to a net area in different directions, due to imperfections or non-uniformities in the twisting. An additional source of uncertainties lies in differences between individual parts in relation to the terminations from the twisted wires to the board or intermediate connectors. In general, it may be required to connect a signal source to measurement electronics which may lie in a different plane and/or at any orientation with respect to the signal source.

Alternatives to twisted wire bundles include co-axial cables, star-quad cables and so forth. However, such cables have complex structures, making them expensive to produce and connect, in addition to being relatively bulky. Additionally, co-axial cables, star-quad cables and so forth do not scale well with the number of connections required, since an additional, bulky cable may be required for each additional signal.

Figure 15:
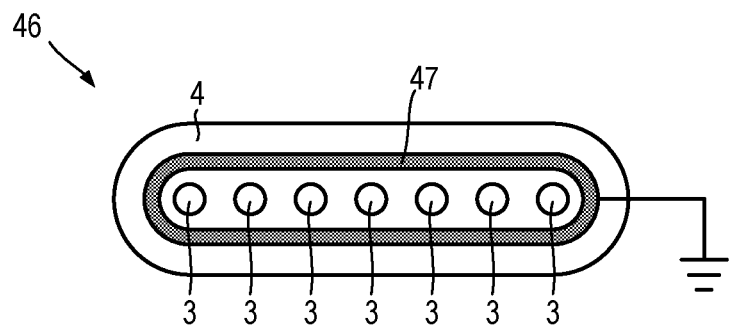
FIG. 15 is a cross-sectional view through an electrostatically shielded substantially planar connector for use in the first to eleventh apparatuses.

The present specification is concerned with apparatuses for measurement of signal sources which obtain significant reductions in magnetic interference using arrays of conductors which may be flexible or rigid. Whilst connecting a signal source to a measurement front end in a conventional manner using a pair of conductors of an array will provide no advantage, the inventors have realised that using a larger number of conductors, namely three or more, an array of conductors may be configured to permit measurements of a signal from a signal source by a measurement front end with significantly reduced interference from time-varying magnetic fields (compared to a conventional two-conductor connection). Any of the examples described herein can additionally be configured to reduce interference from electrical fields, for example using electrostatically shielded substantially planar connectors 46 (FIG. 15).

Figure 20:
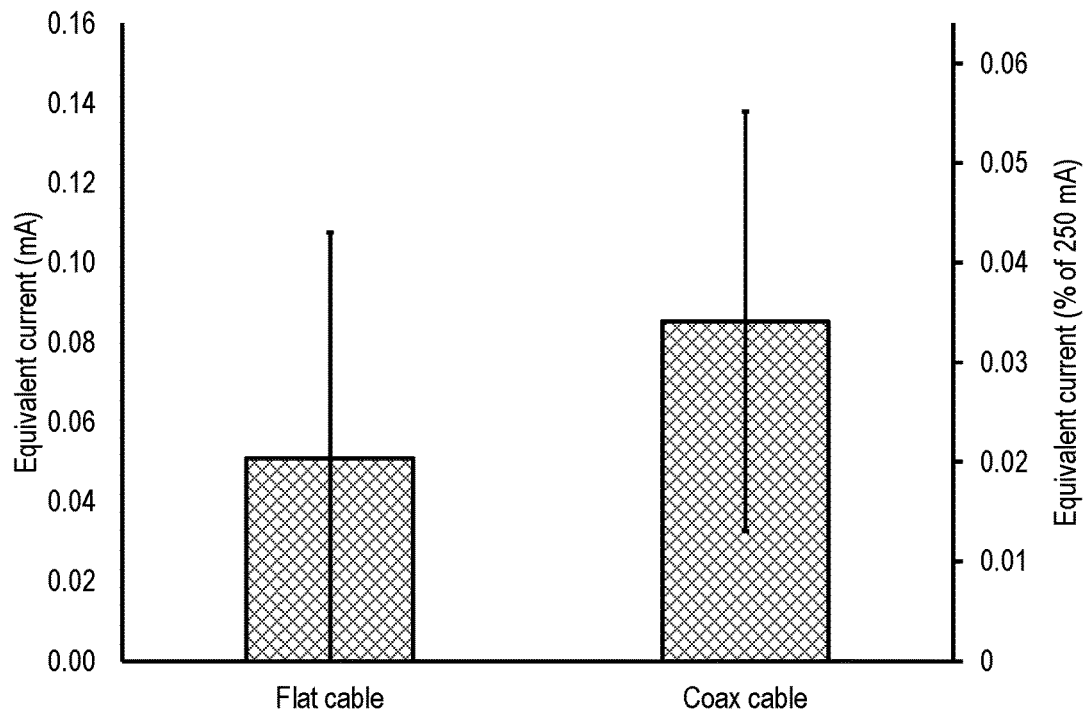
FIG. 20 presents experimental data obtained from spatially uniform time-varying magnetic fields.
Figure 21:
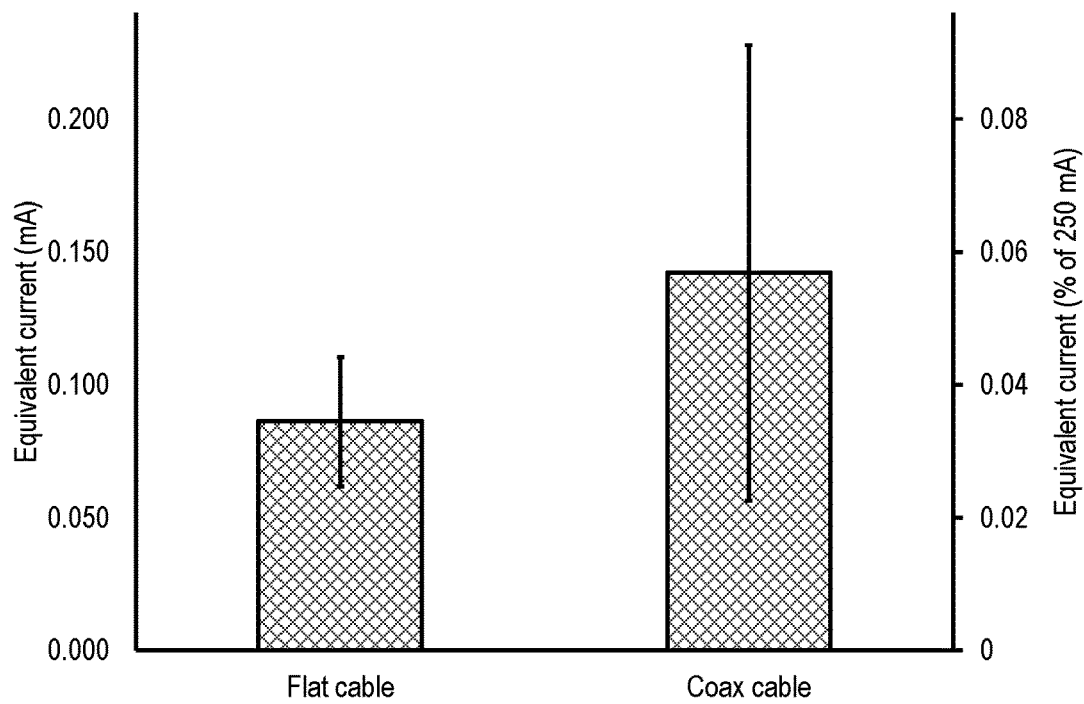
FIG. 21 presents experimental data obtained from time-varying magnetic fields having a spatial gradient.

Whilst co-axial cables are typically considered to be a "gold standard" for high integrity transmission of electrical signals, the inventors have surprisingly found that examples configured according to the present specification may match or even outperform co-axial cables for noise immunity in uniform time-varying magnetic fields (FIG. 20), and even time-varying magnetic fields having a spatial gradient (FIG. 21).

Whilst the teachings of the present specification are applicable to the hereinbefore mentioned example of electricity meters, they are not limited to such applications. In general, the teachings of the present specification may be of use in apparatuses including, but not limited to, laptops, magnetic resonance imaging (MRI) equipment, fusion equipment, sensors located in close proximity to a motor, in electric meters, in switches or relays, in mass spectrometer equipment, in electron microscopes, in particle accelerators, in laboratory equipment, and so forth. The teachings of the present specification may also be of use in audio equipment such as speakers, loud speakers, microphones, mixing desks, musical instruments and so forth.

Figure 1:
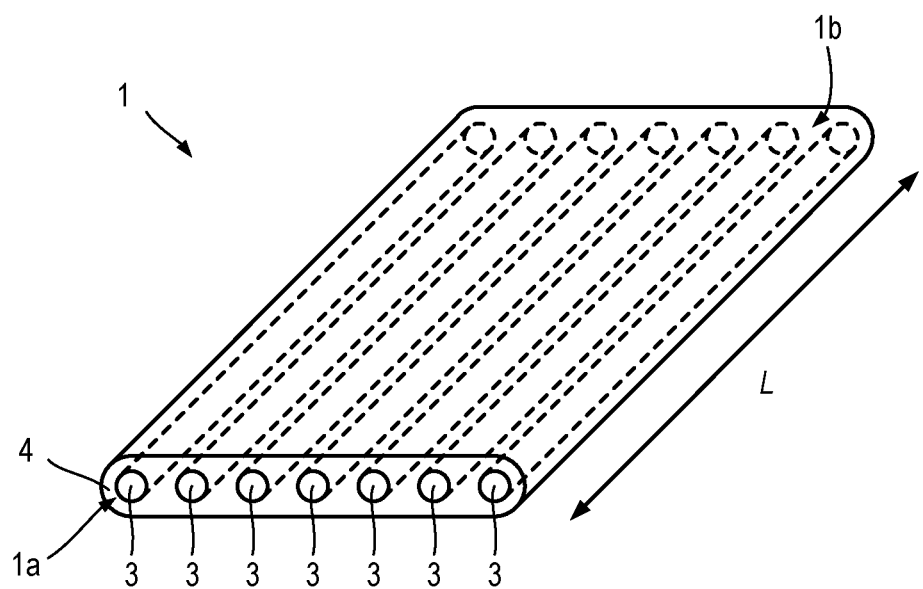
FIG. 1 schematically illustrates a substantially planar connector including an array of conductors.

Referring to FIG. 1, a substantially planar connector 1 is shown.

The substantially planar connector 1 (hereinafter also referred to as "planar connector 1" for brevity) extends for a length L between first and second ends 1a, 1b, and includes a number of conductors 3. Each conductor 3 spans between the first and second ends 1a, 1b. The conductors 3 are supported so that, at each point between the first and second ends 1a, 1b, the conductors are substantially equi-spaced from one another within the planar connector 1. In other words, the conductors 3 form an array within the local reference frame of the planar connector 1. Although shown as linear in FIG. 1, the array may depart from being linear if the planar connector 1 is flexible and is deformed, twisted and so forth. Nonetheless, the identity of the one or two conductors 3 adjacent to any given conductor 3 remain the same at any point along the length L, regardless of how the planar connector 1 is bent, twisted, and/or deformed, and so forth. In the example shown in FIG. 1, the conductors 3 are embedded in an insulating material 4. However, the means of support is not critical provided that the conductors 3 are prevented from substantially changing their relative distances from one another within the planar connector 1 (for example by more than 10%), and in other examples the conductors 3 may be supported on a substrate 5 (FIG. 17), or by any other suitable means of support.

Preferably, the planar connector 1 is flexible along at least part of the length L, and permits bending and/or twisting, in order to make it easy to use the connecter 1 in a wide variety of applications and geometries. Examples of flexible planar connectors 1 include, without being limited to, flexible flat cables (FFC), ribbon cable, conductive tracks patterned onto a flexible printed circuit (FPC) substrate, and so forth. However, in some applications, the planar connector 1 may be rigid, for example the insulating material 4 may be cast around the conductors 3 and allowed to harden, or conductive tracks may be patterned onto a rigid substrate (for example a conventional printed circuit board, PCB), or as an internal conductive layer of a multi-layer PCB.

Although drawn with circular cross-sections in FIG. 1, the conductors 3 may often have other cross-sectional shapes, for example rectangular.

Figure 2:
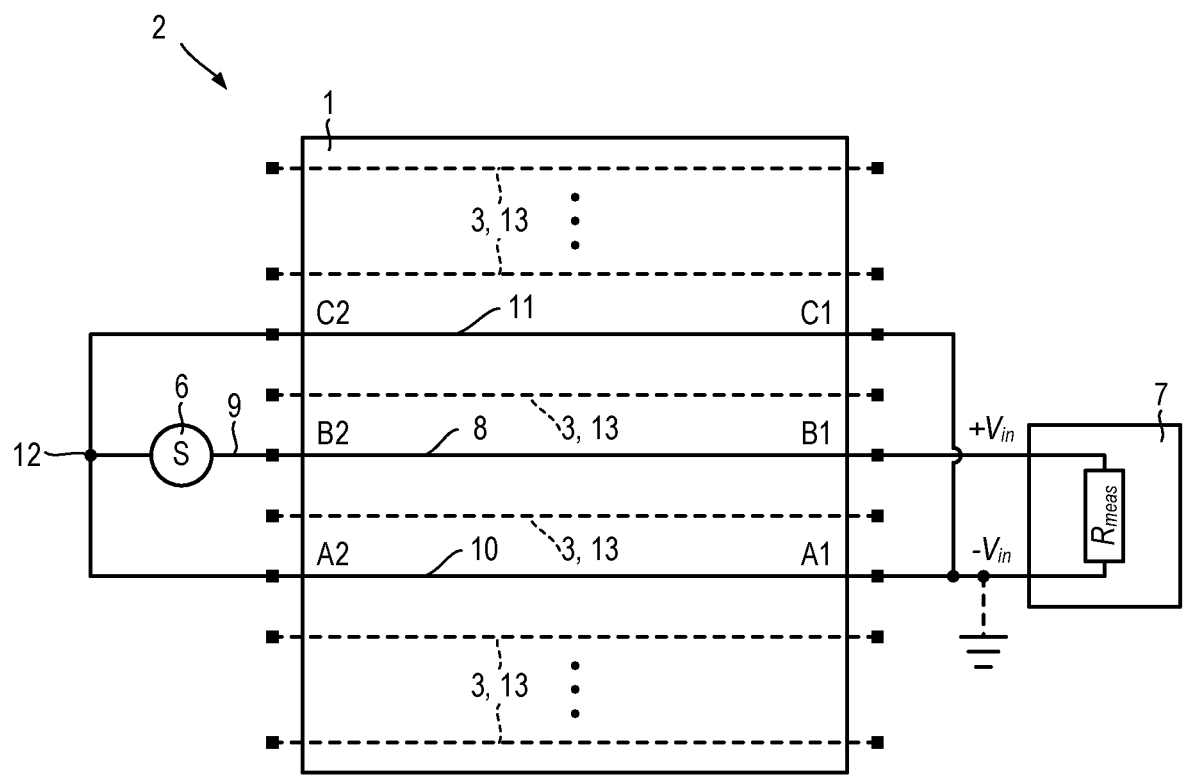
FIG. 2 schematically illustrates a first apparatus.

Referring also to FIG. 2, a first apparatus 2 is shown.

The apparatus 2 includes a signal source 6, a measurement front end 7 and a planar connector 1. The signal source 6 may take the form of any analogue or digital signal source, including but not limited to, a current sensor (e.g. Hall, mutual inductance etc), a microphone, a photodetector, an ultrasonic transducer, a pick-up coil, a digital or analogue output of an integrated circuit, and so forth.

The measurement front end 7 includes first and second inputs $+V_{in}$, $-V_{in}$ for each signal. An effective input impedance $R_{meas}$ connects the first and second inputs $+V_{in}$, $-V_{in}$, and this is preferably large (when used for voltage measurements, for current measurements, magnetic interference is typically less of an issue), for example greater than 10 k$\Omega$, greater than 100 k$\Omega$, greater than 1 M$\Omega$ or greater than 10 M$\Omega$. In general, the measurement front end 7 may include a greater number of inputs, for example, at least one input corresponding to each signal source 6 which the measurement front end 7 is required to measure.

The first and second inputs $+V_{in}$, $-V_{in}$, may be used to conduct a differential measurement between the inputs. Alternatively, the second input $-V_{in}$ may be connected to ground (or another reference potential) for an approximation to a single ended measurement.

The planar connector 1 includes a number of conductors 3 including a first signal conductor 8 connecting a first terminal 9 of the signal source 6 to the first input $+V_{in}$ of the measurement front end 7. In general, the planar connector 1 also includes at least two further conductors 3 which are used to connect the signal source 6 to the measurement front end 7. In the example of the first apparatus 2, second and third signal conductors 10, 11 each connect a second terminal 12 of the signal source 6 to the second input $-V_{in}$ of the measurement front end 7. In the array of conductors 3 within the planar connector 1, the second and third signal conductors 10, 11 bracket the first signal conductor 8. Preferably, though not essentially, the second and third signal conductors 10, 11 are adjacent to the first signal conductor 8 within the array of conductors 3.

The type of termination of the conductors 3 is not critical, although as discussed hereinafter, contributions to loop areas and impedances of the connections to the signal source 6 and/or measurement front end 7 should be considered. Conductors 3 may be connected to the signal source 6 and/or measurement front end 7 in any suitable manner such as, for example, soldering, crimping, terminal connectors (e.g. FFC header), plug-and-socket arrangements, and so forth. For example, if the planar connector 1 is flat flexible cable (FFC), then the connections to the signal source 6 and/or the measurement front end 7 may comprise FFC header.

In general, the signal source 6 and the measurement front end 7 may lie in different planes and at any orientation with respect to one another, and may still be connected using the planar connector 1. For example, the conductors 3 at first and second ends of the planar connector 1 need not be co-planar or lie in parallel planes. The path taken by the planar connector 1 in connecting the signal source 6 and the measurement front end 7 may include bending, twisting and so forth, without changing the fact that the connector 1 is essentially planar (for example within a local reference frame of the planar connector 1).

The planar connector 1 may optionally include further conductors 3, 13, which may be used for connecting to other signal sources 6, and/or for more conventional transmission of one or more digital and/or analogue signals. In this way, the planar connector 1 may incorporate high magnetic immunity connections between one or more signal sources 6 and a measurement front end 7, interspersed with more conventional connections between two electrical devices. One or more further conductors 3, 13 may be interspersed between the first signal conductor 8 and the second and third signal conductors 10, 11, although this is not preferred, and the spacing between the first and second signal conductors 8, 10 and the first and third signal conductors 8, 11 should always be approximately equal.

One or more further conductors 3, 13 other than the at least one signal conductor and the at least two further conductors may be used for transmitting one or more digital and/or analogue signals.

The first, second and third signal conductors 8, 10, 11 form three closed loops (described with reference to labels A1 through C2 for clarity):

1. A1-A2-C2-C1-A1. This first closed loop does not include the signal source 6 or the input impedance $R_{meas}$.
2. A1-A2-S-B2-B1-$R_{meas}$-A1. This second closed loop includes the signal source 6 and input impedance $R_{meas}$.
3. C1-C2-S-B2-B1-$R_{meas}$-C1. This third closed loop also includes the signal source 6 and input impedance $R_{meas}$.

These first, second and third closed loops have areas and impedances matched such that, in response to a uniform time-varying external magnetic field being applied to the apparatus 2, a first unwanted electromotive force $+V_{emf}$ induced at the first input $+V_{in}$ will be substantially equal to a second unwanted electromotive force $-V_{emf}$ induced at the second input $-V_{in}$, in other words $+V_{emf} \approx -V_{emf}$. The first and second unwanted electromotive forces $+V_{emf}$, $-V_{emf}$ correspond to induced potentials which are generated in addition to a desired signal $V_s$ corresponding to the signal source 6. Such unwanted electromotive forces $+V_{emf}$, $-V_{emf}$ will, unless cancelled or otherwise accounted for, register as noise or false signals superposed on the potential $V_s$ from the signal source 6.

The first and second unwanted electromotive forces $+V_{emf}$, $-V_{emf}$ correspond to induced potentials resulting primarily from the conductors 3, 8, 10, 11 of the planar connector 1 and/or connections between the conductors 3, 8, 10, 11 and the signal source 6 and/or the first and second inputs $+V_{in}$, $-V_{in}$. The first unwanted electromotive force $+V_{emf}$ may be considered to be substantially equal to the second unwanted electromotive force $-V_{emf}$ when a difference between the first and second unwanted electromotive forces $+V_{emf}$, $-V_{emf}$ is less than 15%, less than 20 10%, less than 8%, less than 5%, less than 1% or less than 0.5% of the larger of the first and second unwanted electromotive forces $+V_{emf}$, $-V_{emf}$.

The closed loops may be dominated by the areas defined by the conductors 3, 8, 10, 11 of the planar connector 1, however, at least one closed loop will include the signal source 6 and the input impedance $R_{meas}$. The impedances of, and loop areas contributed by, the terminations of conductors 3, 8, 10, 11 and connections between conductors 3, 8, 10, 11 and the signal source(s) 6 and/or measurement front end 7 should preferably also be accounted for when balancing the closed loops to compensate for interference by a time-varying external magnetic field.

Figure 3:
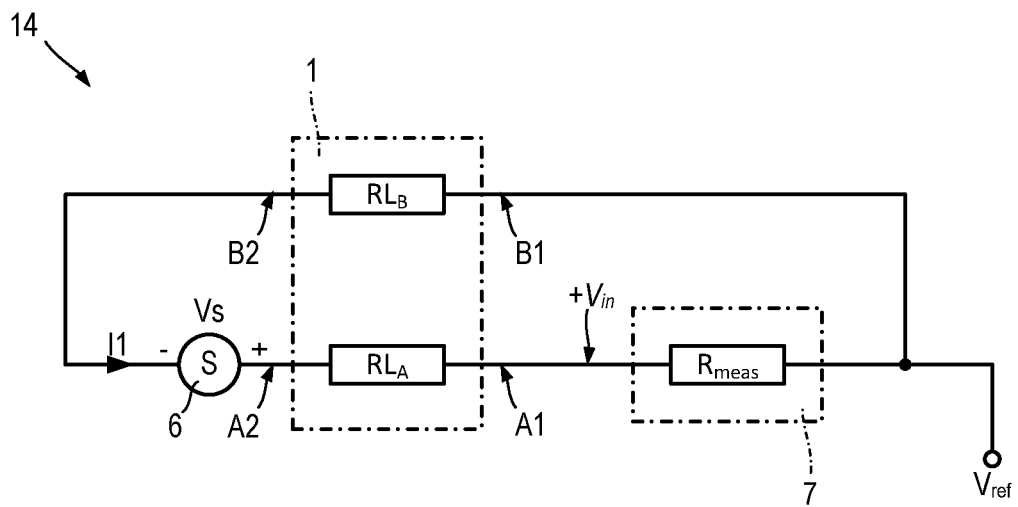
FIG. 3 is an equivalent circuit for a two conductor connection.

Referring also to FIG. 3, an equivalent circuit 14 for a conventional, two-conductor connection to a signal source 6 is shown.

Figure 4:
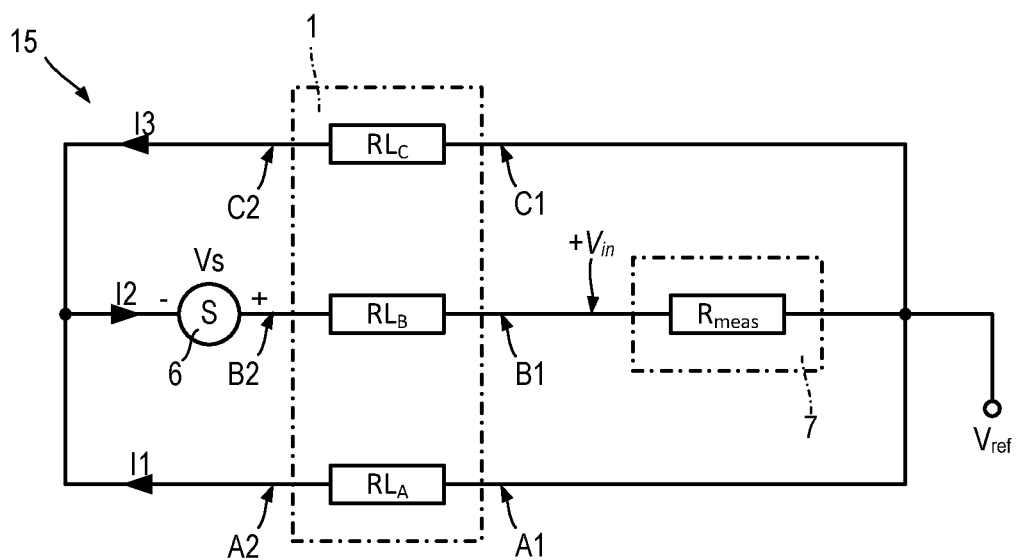
FIG. 4 is an equivalent circuit for the first apparatus shown in FIG. 2.

Referring also to FIG. 4, an equivalent circuit 15 for an example of the first apparatus 2 is shown.

With reference to the equivalent circuits 14, 15, the cancellation (or at least reduction) of interference due to magnetically induced electromotive forces (EMFs) using the first apparatus 2 shall be explained.

In the two-conductor 3 case of equivalent circuit 14, the second input $-V_{in}$ is connected to a reference potential $V_{ref}$. In the presence of a time varying magnetic field having a component perpendicular to the closed loop A1-A2-S-B2-B1-$R_{meas}$-A1, a first EMF1 will be induced, and as typically $R_{meas} \gg RL_A \approx RL_B$, EMF1 will register almost entirely across the inputs $+V_{in}$, $-V_{in}$, such that the signal measured across the inputs $+V_{in}$, $-V_{in}$ will be equal to the sum of the source 6 and the induced potential EMF1, i.e. $V_s$+EMF1. The additional voltage EMF1 represents an error in the desired signal $V_s$ corresponding to the signal source 6.

Referring to the equivalent circuit 15 of the first apparatus 2, there are first (A1-A2-C2-C1-A1), second (A1-A2-S-B2-B1-$R_{meas}$-A1) and third (C1-C2-S-B2-B1-$R_{meas}$-C1) closed loops. In the presence of a time varying magnetic field having a component perpendicular to plane of the figure, a first EMF1 is induced about the first closed loop (A1-A2-C2-C1-A1), a second EMF2 is induced about the second closed loop (A1-A2-S-B2-B1-$R_{meas}$-A1) and a third EMF3 is induced about the third closed loop (C1-C2-S-B2-B1-$R_{meas}$-C1).

The input impedance $R_{meas}$ is typically high (for voltage measurements), and the line resistances $RL_A$, $RL_B$, $RL_C$ of the respective second, first and third signal conductors 10, 8, 11 are approximately equal to one another, whilst being significantly lower than the input impedance $R_{meas}$, i.e. $RL_A \approx RL_B \approx RL_C \ll R_{meas}$. Consequently, there is very low or negligible current I2≈0 along the first signal conductor 8, and the second and third induced potentials EMF1, EMF3 will register primarily across the input impedance $R_{meas}$. The second and third induced potentials EMF1, EMF3 will have opposite signs, and because the conductors 8, 10, 11 are equally spaced (loops A1-A2-S-B2-B1-$R_{meas}$-A1 and C1-C2-S-B2-B1-$R_{meas}$-C1 link approximately equal flux), will approximately cancel each other out. Provided that the first closed loop (A1-A2-C2-C1-A1) is balanced with $RL_A$=$RL_C$, the signal measured across the inputs $+V_{in}$, $-V_{in}$ will always be the desired signal $V_s$ even in the presence of a time-varying spatially-uniform magnetic field. Expressed differently, the second input $-V_{in}$, is clamped to the reference potential $V_{ref}$ so that the second unwanted electromotive force must be $-V_{emf}$=0, whilst the impedances and areas of the closed loops are balanced such that the net effect of the induced potentials EMF1, EMF2, EMF3 at the first input $+V_{in}$ is a net first unwanted electromotive force of $+V_{emf} \approx 0$.

The spacing between adjacent conductors will typically be small (e.g ≤1 mm or ≤250 μm), and consequently the effects of a time-varying magnetic field having spatial variation which is large compared to the conductor 3 spacing may also be substantially reduced. In practice, some effect of the time-varying magnetic field may remain because perfect balance $RL_A$=$RL_C$ is not possible in practice, and $RL_A \approx RL_C$ is more realistic, and also because in practice time-varying magnetic fields will typically not be entirely uniform.

In this way, by using three conductors 8, 10, 11 forming part of an equi-spaced array of conductors 3 supported within a planar connector 1, transmission of the signal $V_s$ from the signal source 6 to the measurement front end 7 may be accomplished whilst providing near complete immunity to uniform (far field) source of time-varying magnetic interference, and improved immunity to spatially varying (near field) sources of time-varying magnetic interference. A circulating current is generated around the closed loop (A1-A2-C2-C1-A1), however due to the arrangement of conductors this does not result in a net error in a measurement between the first and second inputs $+V_{in}$, $-V_{in}$.

Moreover, the second apparatus 2 may permit obtaining these advantages using simple, widely available, and cheap linear format planar connectors such as flat flexible cable (FFC), ribbon cable, or conductors 3 patterned onto flexible printed circuit (FPC) substrates.

The using of FFC cables may be particularly advantageous, because the pitch (spacing between adjacent conductors 3) in FFC cables is typically held to tight tolerances. Typical differences in centre to centre spacing of adjacent conductors 3 may be better than 1%, e.g. a few microns on a 1 mm pitch.

The second apparatus 2 is only one example of using three of more conductors 3 of a planar connector 1 including a number of conductors arranged in an equi-spaced array. In the general case, the planar connector 1 may be used to connect one, two, or more signal sources 6 to a measurement front end 7 having at least a pair of inputs $+V_{in}$, $-V_{in}$. In the general case, the planar connector 1 will include at least one signal conductor 3 connecting one of the signal sources 6 to one of the inputs $+V_{in}$, $-V_{in}$ of the measurement front end 7, and at least two further conductors 3 connecting to the one or more signal sources 6, with one or both of the two further conductors also connecting to the paired input $+V_{in}$, $-V_{in}$ of the measurement front end 7. The at least one signal conductor 3 and the at least two further conductors 3 will belong to one or more closed loops (some closed loops may include one or more signal sources 6 whilst others may omit any signal source(s) 6), and the closed loops so formed should have areas and impedances configured such that in response to a uniform time-varying external magnetic field being applied to the apparatus 2, a first unwanted electromotive force $+V_{emf}$ induced at a first input $+V_{in}$ will be substantially equal to a second unwanted electromotive force $-V_{emf}$ induced at a second input $-V_{in}$.

The measurement front end 7 performs a differential measurement between a first input $+V_{in}$ connected to the at least one signal conductor 3, and a second input $-V_{in}$ connected to a second signal conductor 3 which is one of the at least two further conductors 3. In this way, the substantially equal first and second unwanted electromotive forces $+V_{emf}$, $-V_{emf}$ may register as a common-mode potential $+V_{emf} \approx -V_{emf} = V_{cm}$ which may be rejected by the differential measurement of the measurement front end 7.

One of the first and second inputs $+V_{in}$, $-V_{in}$ may be connected to ground, or another reference potential $V_{ref}$ in order to provide an approximately single-ended measurement. However, a truly single ended measurement is unviable because this would involve additional loops via common grounding electrodes (which do not run through the planar connector 1), potentially rendering controlling the loop areas and impedances impractical or impossible.

The at least one signal conductor and the at least two further conductors may, in combination with one or more signal sources 6 and a measurement front end 7, form fewer than three closed loops, for example two closed loops or a single closed loop. Alternatively, the at least one signal conductor and the at least two further conductors, in combination with one or more signal sources 6 and a measurement front end 7, may form more than three closed loops. At least one closed loop may omit any signal sources 6 and/or input impedances $R_{meas}$. Any closed loop may cross itself to form two or more sub-loops (twisted loop), for example a single crossing to form two sub-loops having a figure-of-eight topology. A closed loop which crosses itself does so geometrically and/or topologically, but not electrically. In other words, a closed loop which crosses itself is not shorted at the crossing. Closed loops or sub-loops may have opposed directions, so that when electromotive forces (EMFs) are induced in those closed loops or sub-loops in response to a uniform time-varying magnetic field, the corresponding EMFs will have opposite signs.

In some examples, the one or more closed loops have areas and impedances may be further configured (for example by adding fourth and further conductors 3) such that, in response to a time-varying external magnetic field with uniform spatial gradient, or having a magnitude varying quadratically with spatial coordinates, being applied to the apparatus 2, a first unwanted electromotive force $+V_{emf}$ induced at a first input $+V_{in}$ will be substantially equal to a second unwanted electromotive force $-V_{emf}$ induced at a second input $-V_{in}$.

Further examples of these principles shall be described in relation to FIGS. 5 to 14.

Figure 5:
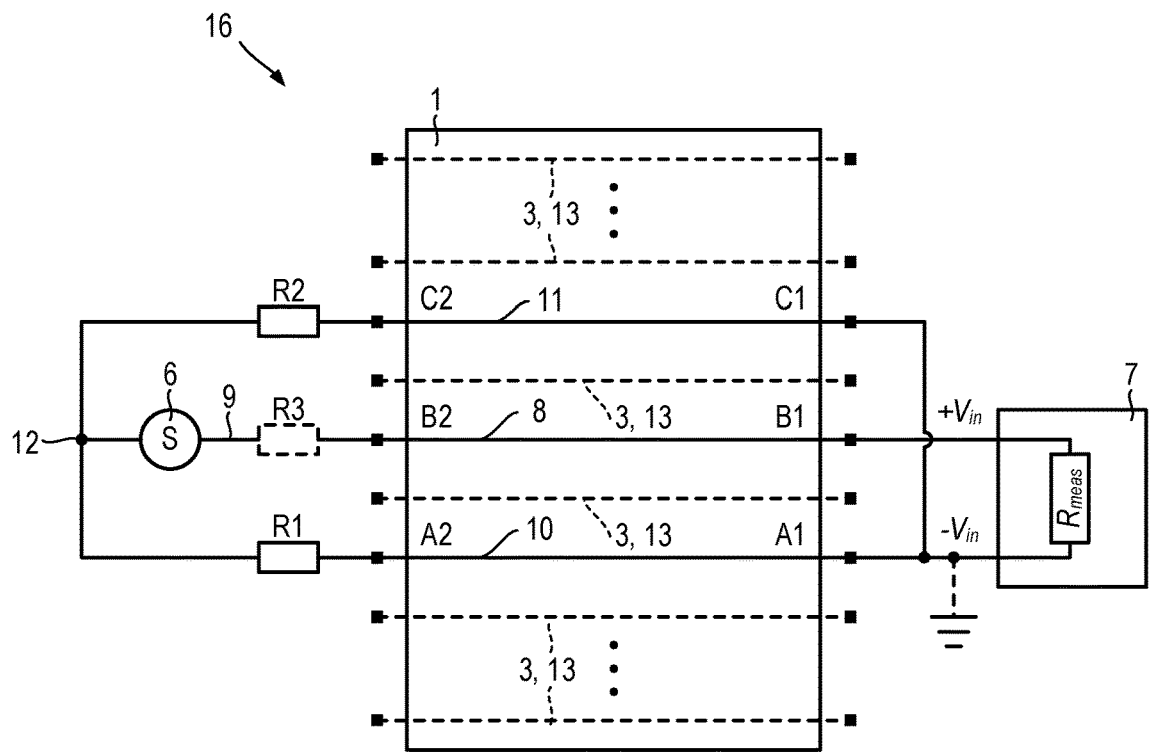
FIG. 5 schematically illustrates a second apparatus.

Referring also to FIG. 5, a second apparatus 16 is shown.

The second apparatus 16 is the same as the first apparatus 2, except that first and second resistances R1, R2 are connected in series with the second and third signal conductors 10, 11 respectively. The second apparatus 16 includes three closed loops, which are the same as those defined for the first apparatus 2 (except for the addition of the resistances R1, R2).

In practice, the line resistances $RL_A$, $RL_C$ of the second and third signal conductors 10, 11 may be slightly unbalanced, especially when account is taken of contact resistances into and out of the second and third signal conductors 10, 11. Since any imbalance may cause an error in the measurement of the signal source 6 in the presence of external time-varying magnetic fields, a ratio between the resistances along the second and third signal conductors 10, 11 should be made as close to 1:1 (unity) as practical. By adding first and second resistances R1, R2 (preferable high tolerance) in series with the second and third signal conductors 10, 11, the relative significance of any differences between the second and third signal conductors 10, 11 may be reduced. The first and second resistances R1, R2 need not be large, and typically may be of the order of 1Ω. This may be compared with a resistance of less than about 100 mΩ for a 30 cm long conductor 3 of a flat flexible cable (FFC) having a 1 mm pitch between adjacent conductors 3.

Optionally, a third resistance R3 may be placed in series with the first signal conductor 8. The third resistance R3 may be useful for avoiding a significant mismatch in resistance between the first signal conductor 8 and the parallel second and third signal conductors 10, 11 in planar connectors 1 having longer lengths L.

In the general case, any of the following examples (FIG. 6 onwards) may be modified to include one or more resistances connected in series with respective conductors 3, so as to improve balancing (by adjusting impedances) between different closed loops and/or sub-loops of a twisted loop. In general, such resistances should be larger than the resistance of the corresponding conductors 3 (including contact resistances into/out of the conductors 3).

Figure 6:
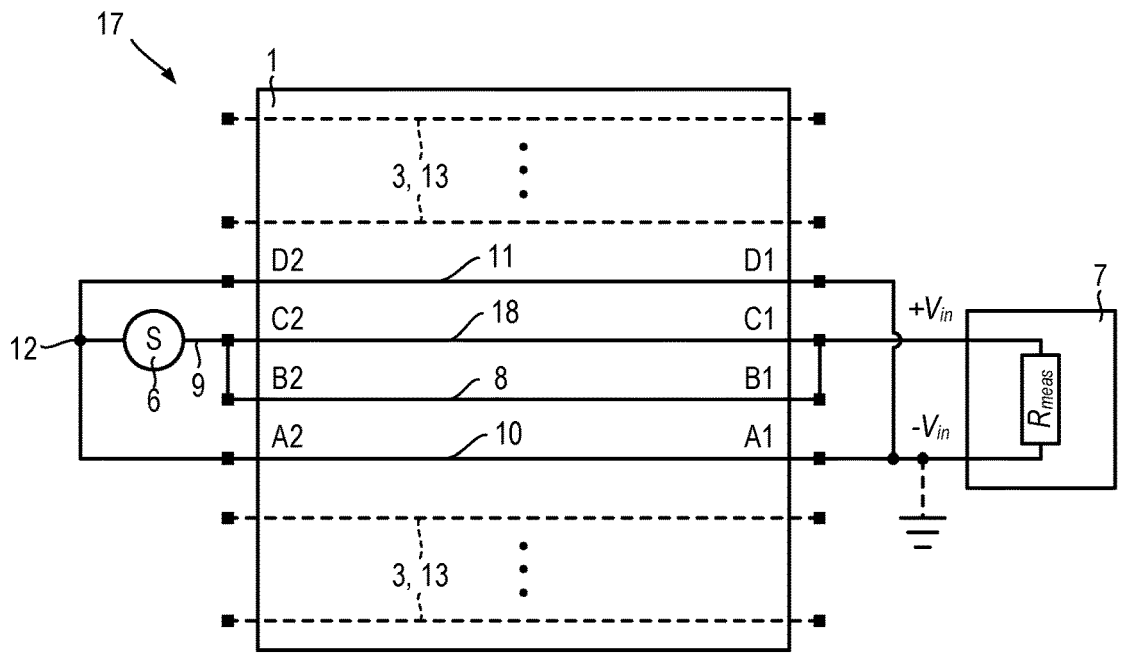
FIG. 6 schematically illustrates a third apparatus.

Referring also to FIG. 6, a third apparatus 17 is shown.

The third apparatus 17 is the same as the first apparatus 2, except that the third apparatus 17 further includes a fourth signal conductor 18 connecting the first terminal 9 to the first input $+V_{in}$. The fourth signal conductor 18 is positioned within the array of conductors 3 to be adjacent to the first signal conductor 8 and between the second and third signal conductors 10, 11. In other words, the second and third signal conductors 10, 11 bracket the first and fourth signal conductors 8, 18.

Similar to the second apparatus 16 including the optional third resistance R3, the third apparatus 17 may provide improved impedance balancing between the connections to the first and second terminals 9, 12. Whereas the second apparatus 16 including the optional third resistance R3 may allow balancing of the resistances, the third apparatus 18 enables improved balancing of the impedance (resistance, self-inductance and capacitance) between the first and fourth signal conductors 8, 18 and the second and third signal conductors 10, 11.

First and second resistances R1, R2 may be placed in series with the second and third signal conductors 10, 11 respectively, in the same way as for the second apparatus 16.

The third apparatus 17 includes four closed loops:
1. A1-A2-D2-D1-A1
2. B1-B2-C2-C1-B1
3. A1-A2-S-B∥C-$R_{meas}$-A1 (the notation B∥C denotes B2-B1 in parallel with C2-C1)
4. D1-A2-S-B∥C-$R_{meas}$-D1 (the notation B∥C denotes B2-B1 in parallel with C2-C1)

It may be noted that the second loop in the listing, B1-B2-C2-C1-B1, is purely internal and has no effect on the measurement front end 7.

Figure 7:
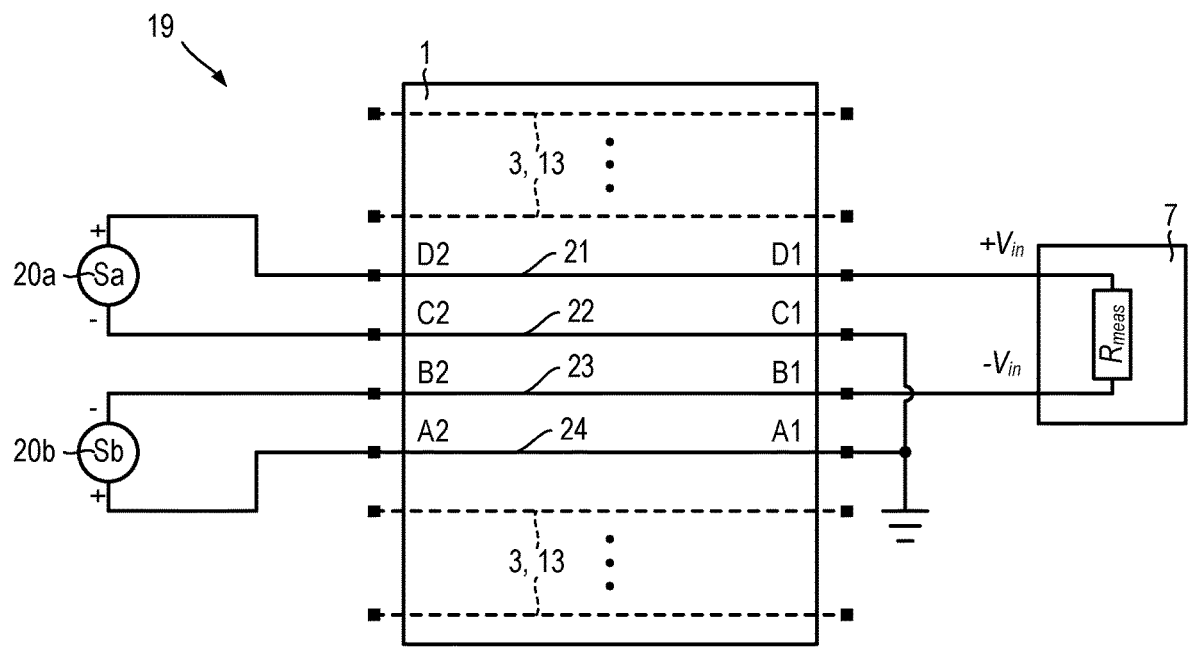
FIG. 7 schematically illustrates a fourth apparatus.

Referring also to FIG. 7, a fourth apparatus 19 is shown.

The fourth apparatus 19 includes a planar connector 1 connecting between a pair of balanced signal sources 20a, 20b and a measurement front end 7 having first and second inputs $+V_{in}$, $-V_n$. One example of a pair of balanced signal sources 20a, 20b is a pair of coils in a dI/dt current sensor.

A fifth signal conductor 21 connects the first input $+V_{in}$ to the positive terminal of the first balanced signal source 20a. A sixth signal conductor 22 connects the negative terminal of the first balanced signal source 20a to ground or to a reference potential $V_{ref}$. A seventh signal conductor 23 connects the second input $-V_{in}$ to the negative terminal of the second balanced signal source 20b. An eighth signal conductor 24 connects the positive terminal of the second balanced signal source 20b to ground or to a reference potential $V_{ref}$.

The sixth and seventh signal conductors 22, 23 are adjacent in the array of conductors 3 within the planar connector 1, and are bracketed by the fifth and eighth signal conductors 21, 24. The fifth and eighth signal conductors 21, 24 are preferably, though not essentially, adjacent to the sixth and seventh signal conductors 22, 23 in the array of conductors 3 within the planar connector 1.

The fifth to eighth signal conductors 21, 22, 23, 24 belong to a single closed loop A1-A2-Sb-B2-B1-$R_{meas}$-D1-D2-Sa-C2-C1-A1, which is crossed to form a figure-of-eight topology having a first sub-loop including the first source 20a and a second sub-loop including the second source 20b. The pair of sub-loops have areas and impedances matched such that the first unwanted EMF+$V_{emf}$ registering at the first input $+V_{in}$ will be substantially equal to the second unwanted EMF $-V_{emf}$ registering at the second input $-V_{in}$. In this way, the effects of a time varying uniform magnetic field will appear to the measurement front end 7 as a common mode voltage $+V_{emf} \approx +V_{emf} \approx V_{cm}$, which will be rejected by the differential measurement between the first and second inputs $+V_{in}$, $-V_{in}$.

Any of the fifth to eighth signal conductors 21, 22, 23, 24 may be placed in series with a resistance (not shown), in order to improve impedance balancing as described in relation to the second apparatus 16.

Figure 8:
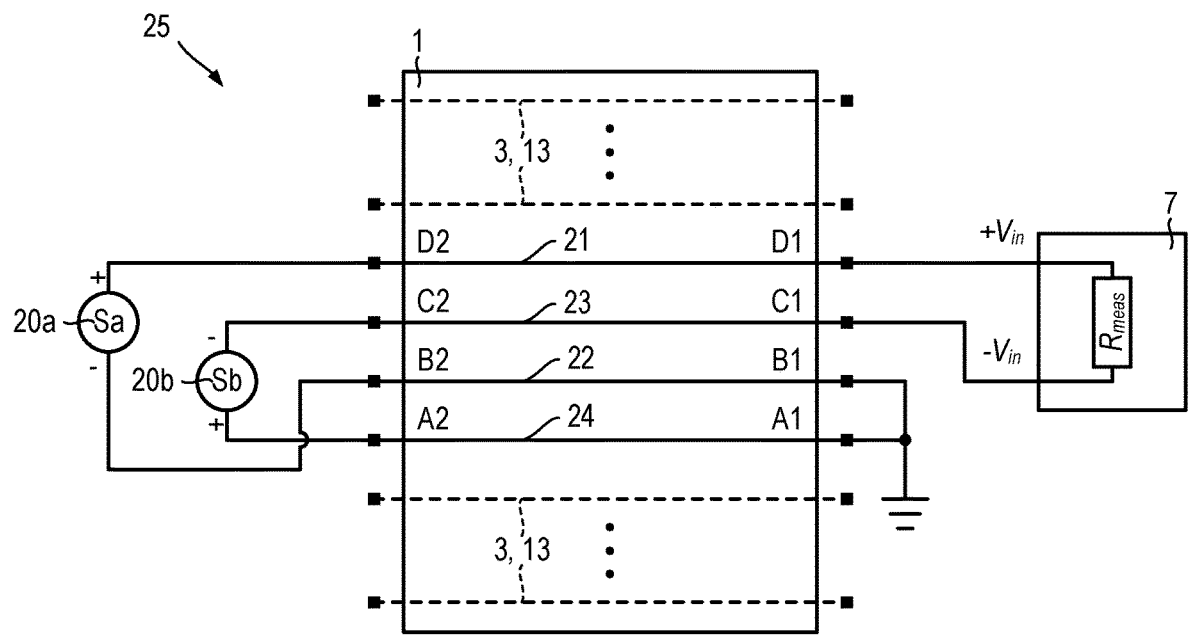
FIG. 8 schematically illustrates a fifth apparatus.

Referring also to FIG. 8, a fifth apparatus 25 is shown.

The fifth apparatus 25 is the same as the fourth apparatus 19, except that the ordering of the fifth to eighth signal conductors 21, 22, 23, 24 within the array of conductors 3 is modified. In the fifth apparatus, the fifth and seventh signal conductors 21, 23 are adjacent to one another, and the sixth and eighth signal conductors 22, 24 are adjacent to one another. As in the fourth apparatus 19, the fifth apparatus 25 defines a single, closed loop A1-A2-Sb-C2-C1-$R_{meas}$-D1-D2-Sa-B2-B1-A1 which crosses itself to define balanced, opposing sub-loops.

Any of the fifth to eighth signal conductors 21, 22, 23, 24 may be placed in series with a resistance (not shown), in order to improve impedance balancing as described in relation to the second apparatus 16.

Figure 9:
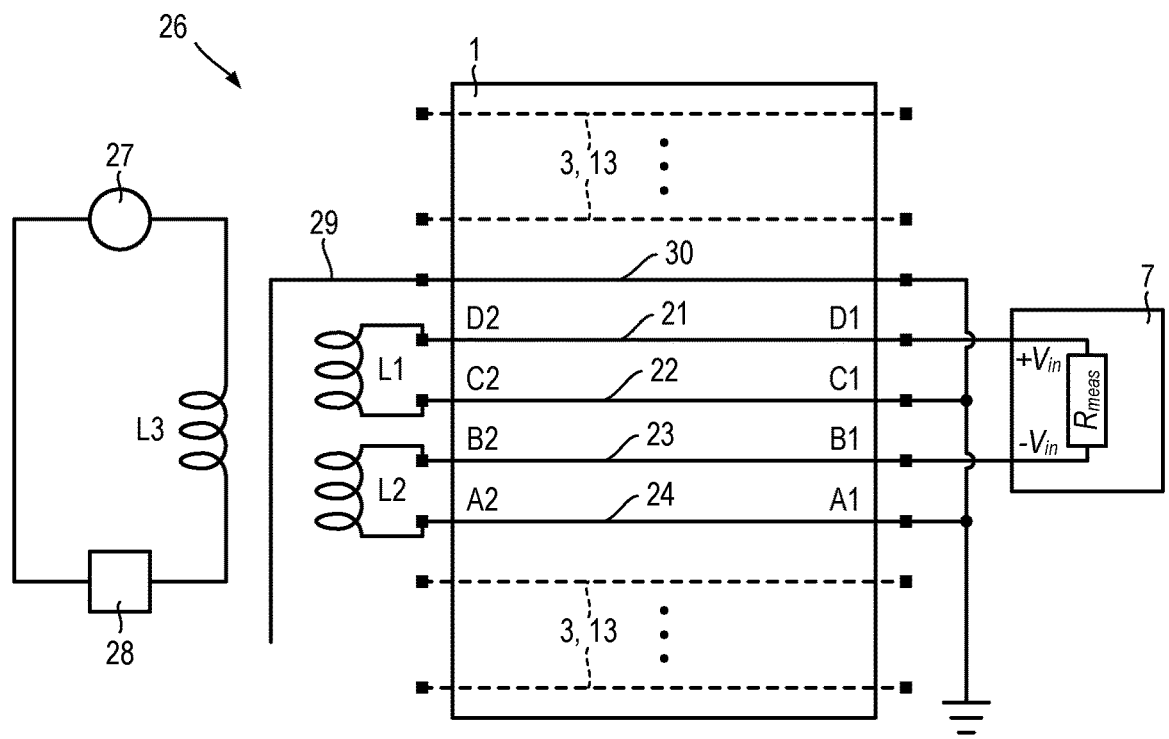
FIG. 9 schematically illustrates a sixth apparatus.

Referring also to FIG. 9, a sixth apparatus 26 is shown.

The sixth apparatus 26 is an example of the fourth apparatus 19, implemented using first and second coils L1, L2 to provide the first and second balanced signal sources 20a, 20b. The first and second coils L1, L2 are inductively coupled to a third coil L3 in order to enable monitoring current supplied from a supply 27 to a load 28. For example, the supply 27 could be a mains electrical supply, the load 28 could be one or more appliances and/or lights of a domestic, commercial or industrial property, and the sixth apparatus 26 could be an electricity meter.

The sixth apparatus 26 also includes an electrostatic shield 29, grounded using a ground conductor 30 of the planar connector 1. The electrostatic shield 29 may prevent capacitive coupling of the coils L1, L2 to a time varying output voltage of the supply 27.

In this way, the planar connector 1 of the sixth apparatus 26 is configured to prevent (or at least reduce) interference from both time-varying magnetic fields and electrical fields in the local environment.

Any of the fifth to eighth signal conductors 21, 22, 23, 24 may be placed in series with a resistance (not shown), in order to improve impedance balancing as described in relation to the second apparatus 16.

Figure 10:
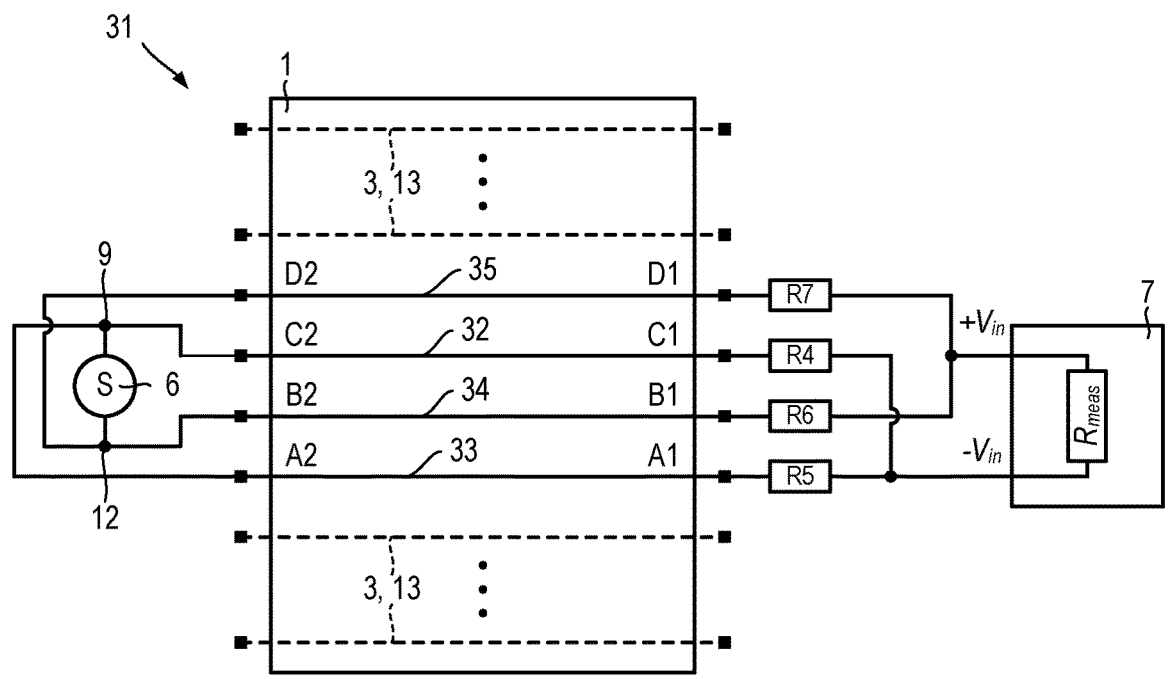
FIG. 10 schematically illustrates a seventh apparatus.

Referring also to FIG. 10, a seventh apparatus 31 is shown.

The seventh apparatus 31 may provide improved performance in rejecting EMFs induced by close/near time-varying field sources which are not well approximated as spatial uniform fields, and/or magnetic fields with uniform spatial gradient. The seventh apparatus 31 may provide superior performance against time-varying magnetic fields having a magnitude varying quadratically with spatial coordinates (in the region of the planar connector 1).

The seventh apparatus 31 includes a signal source 6 having first and second terminals 9, 12, coupled by a planar connector 1 to a measurement front end 7 having first and second inputs $+V_{in}$, $-V_{in}$. Ninth and tenth signal conductors 32, 33 connect the first terminal 9 to the first input $+V_{in}$. Eleventh and twelfth signal conductors 34, 35 connect the second terminal 12 to the second input $-V_{in}$. The ninth and tenth signal conductors 32, 33 are interleaved with the eleventh and twelfth signal conductors 34, 35. The tenth signal conductor 33 is between the eleventh and twelfth signal conductors 34, 35 and the eleventh signal conductor 34 is between the ninth and tenth signal conductors 32, 33.

A fourth resistance R4 connected in series with the ninth signal conductor 32 is one third the resistance of a fifth resistance R5 connected in series with the tenth signal conductor 33. A sixth resistance R6 connected in series with the eleventh signal conductor 34 is one third the resistance of a seventh resistance R7 connected in series with the twelfth signal conductor 35. The fourth to seventh resistances R4, R5, R6, R7 serve to weight EMFs induced along the ninth to twelfth signal conductors 32, 33, 34, 35 in order to compensate for the differences in areas linked by the closed loops including the ninth to twelfth signal conductors 32, 33, 34, 35.

The seventh apparatus 31 includes three significant closed loops:
1. R5-A1-A2-C2-C1-R4-R5
2. R6-B1-B2-D2-D1-R7-R6
3. A||C-S-B||D-$R_{meas}$-A||C In which e.g. A||C denotes the ninth and tenth signal conductors 32, 33 and respective resistances R4, R5 connected in parallel, and B||D similar for the eleventh and twelfth signal conductors 34, 35 and respective resistances R6, R7 connected in parallel.

The seventh apparatus 31 requires good balancing of resistances, and the fourth to seventh resistances R4, R5, R6, R7 should be larger than the line and contact resistances of the respective conductors 32, 33, 34, 35.

The seventh apparatus 31 provides good immunity to interference from time-varying magnetic fields which are spatially uniform, have uniform spatial gradient or have a magnitude varying quadratically with spatial coordinates, and is also electrostatically balanced to reduce interference from nearby alternating voltages.

Figure 11:
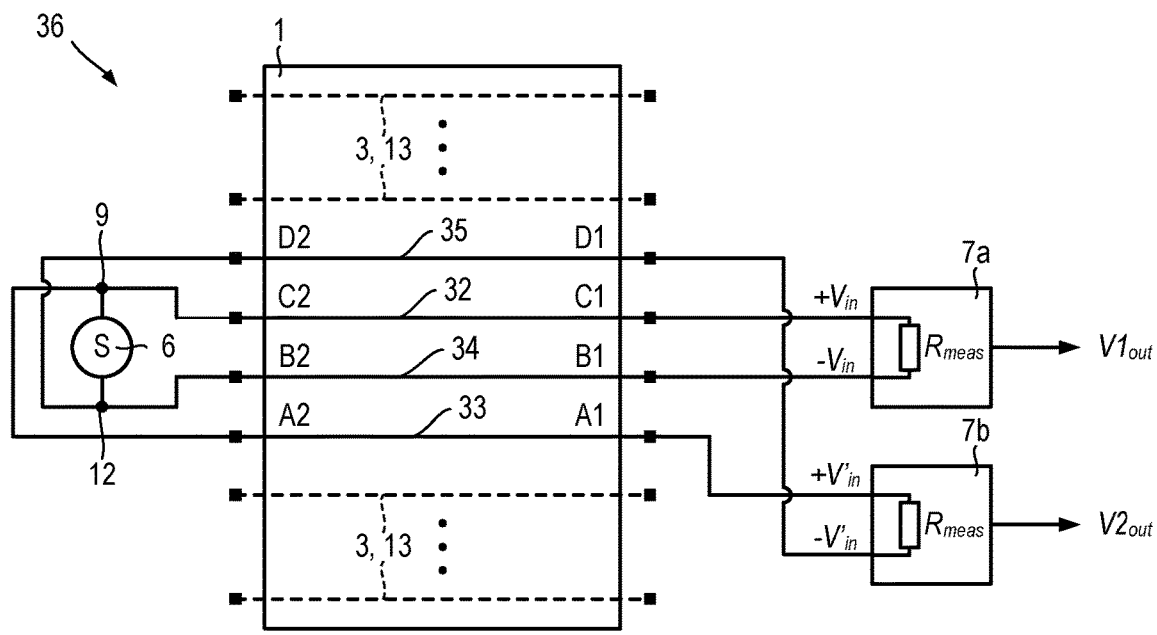
FIG. 11 schematically illustrates an eighth apparatus.

Referring also to FIG. 11, an eighth apparatus 36 is shown.

The eighth apparatus 36 is similar to the seventh apparatus 31, except that the weighting of EMFs induced along the ninth to twelfth signal conductors 32, 33, 34, 35 is accomplished in the digital domain instead of using the fourth to seventh resistances R4, R5, R6, R7.

The eighth apparatus 36 includes a planar connector 1 connecting signal source 6 to a measurement front end 7a having first and second inputs $+V_{in}$, $-V_{in}$, and a measurement front end 7b having third and fourth inputs $+V'_{in}$, $-V'_{in}$. The measurement front ends 7a, 7b may be separate devices, or may be integrated as a single measurement front end 7. The first and second inputs $+V_{in}$, $-V_{in}$ correspond to a first output $V1_{out}$ and the third and fourth inputs $+V'_{in}$, $-V'_{in}$, correspond to a second output $V2_{out}$. The apparatus calculates a final signal based on the combination $0.75V1_{out}+0.25V2_{out}$.

The specific weights 0.75 and 0.25 may be varied if the relative positions (and consequently areas) of the ninth to twelfth signal conductors 32, 33, 34, 35 are varied with respect to each other within the array of conductors 3 within the planar connector 1.

The eighth apparatus 36 includes three closed loops:
1. A1-A2-S-D2-D1-$R_{meas}$-A1 (corresponding to $V2_{out}$)
2. B1-B2-S-C2-C1-$R_{meas}$-B1 (corresponding to $V1_{out}$)
3. A1-A2-C2-C1-$R_{meas}$-B1-B2-D2-D1-$R_{meas}$-A1 (self-crossing loop)

Figure 12:
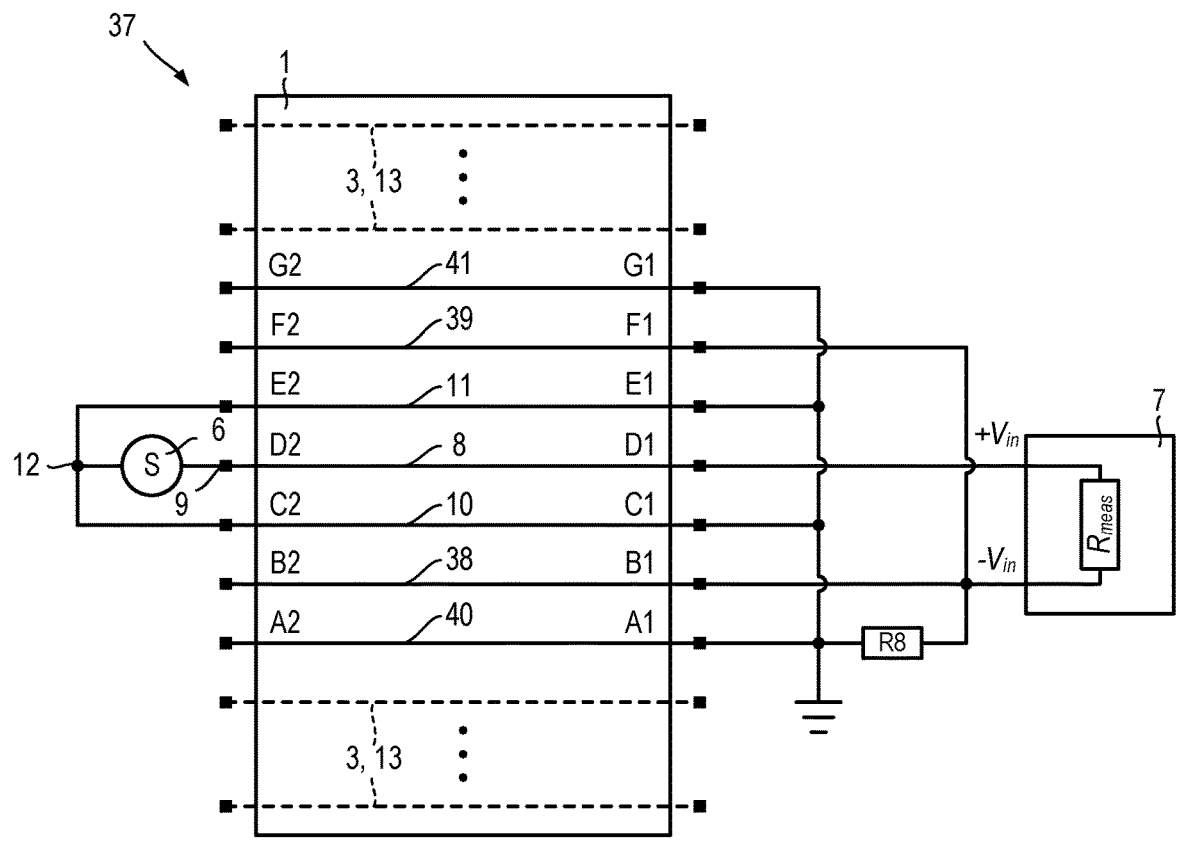
FIG. 12 schematically illustrates a ninth apparatus.

Referring also to FIG. 12, a ninth apparatus 37 is shown.

In the ninth apparatus 37, conductors 3 which bracket first to third signal conductors 8, 10, 11 are connected to system ground (or another reference potential $V_{ref}$) and used for additional shielding of electrical interference, whilst other conductors 3 are connected to the second input $-V_{in}$ and used to equalise pick-up between positive and negative parts in order to minimise the effects of capacitive coupling.

The ninth apparatus 37 includes a signal source 6 connected to a measurement front end 7 having first and second inputs $+V_{in}$, $-V_{in}$ using a planar connector 1.

Similar to the first apparatus 2, the planar connector 1 includes a first signal conductor 8 connected to a first terminal 9 of the signal source 6 and second and third conductors 10, 11 both connected to a second terminal 12 of the signal source 6. On the measurement front end 7 side, the first signal conductor 8 is connected to the first input $+V_{in}$, whilst the second and third signal conductors 10, 11 are coupled to system ground (or other reference potential $V_{ref}$). The second input $-V_{in}$ is coupled to the second and third signal conductors 10, 11 via an eighth resistance R8 which is preferably twice the resistance of the signal source 6.

The ninth apparatus also includes first and second pick-up balancing conductors 38, 39 which are connected to the second input $-V_{in}$ on the measurement front end 7 side of the planar connector 1, and which float on the signal source 6 side of the planar connector 1. The first and second pick-up balancing conductors 38, 39 bracket the first to third signal conductors 8, 10, 11 within the array of conductors 3 within the planar connector 1.

The ninth apparatus also includes first and second shielding conductors 40, 41 which are connected to ground (or other reference potential $V_{ref}$) on the measurement front end 7 side of the planar connector 1, and which float on the signal source 6 side of the planar connector 1. The first and second shielding conductors 40, 41 bracket the first to third signal conductors 8, 10, 11 and the first and second pick-up balancing conductors 38, 39 within the array of conductors 3.

The ninth apparatus 37 is optimised for magnetic immunity (reduction of interference from time varying magnetic fields), and provided that the eighth resistance R8 is equal to twice the resistance of the signal source 6, the ninth apparatus 37 should also reduce interference from electrical fields having spatial gradients.

The ninth apparatus 37 includes three closed loops:
1. C1-C2-S-E2-E1-C1
2. C1-C2-S-D2-D1-$R_{meas}$-R8-C1
3. E1-E2-S-D2-D1-$R_{meas}$-R8-E1

Resistances (not shown) may be placed in series with the first, second and/or third signal conductors 8, 10, 11 in order to improve resistance balancing, in a similar way to the second apparatus 16.

Figure 13:
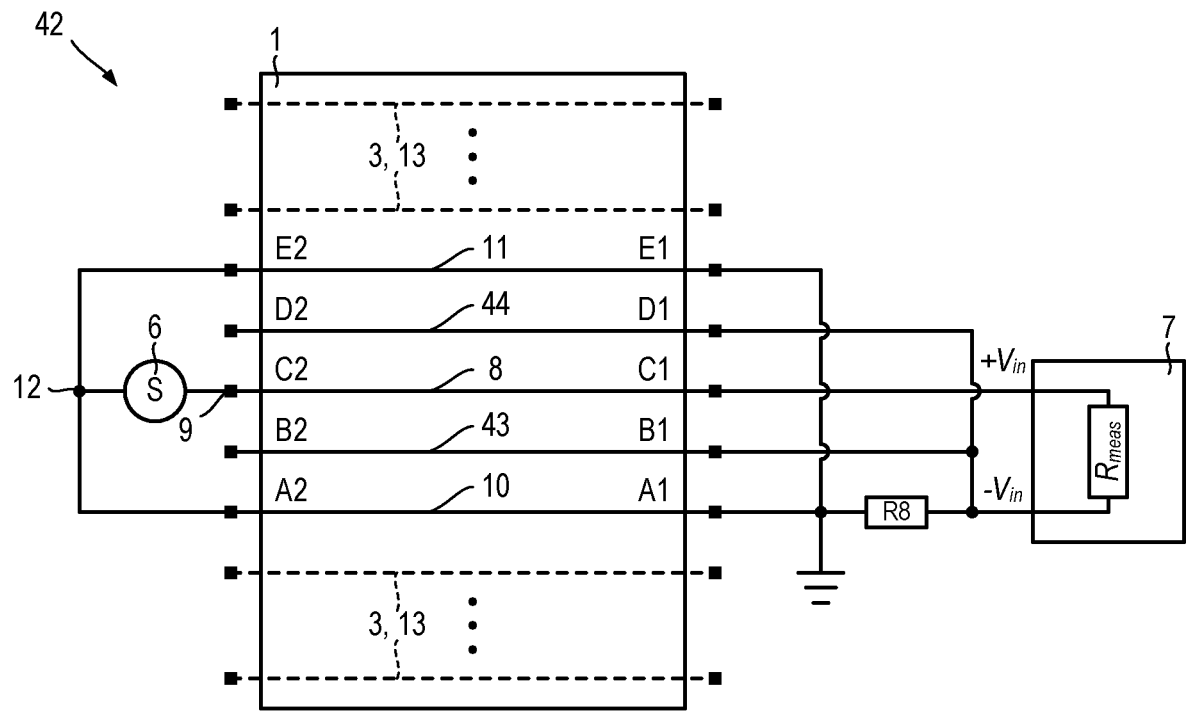
FIG. 13 schematically illustrates a tenth apparatus.

Referring also to FIG. 13, a tenth apparatus 42 is shown.

The tenth apparatus 42 includes a signal source 6 connected to a measurement front end 7 having first and second inputs $+V_{in}$, $-V_{in}$ using a planar connector 1.

Similar to the first apparatus 2, the planar connector 1 includes a first signal conductor 8 connected to a first terminal 9 of the signal source 6 and second and third conductors 10, 11 both connected to a second terminal 12 of the signal source 6. On the measurement front end 7 side, the first signal conductor 8 is connected to the first input $+V_{in}$, whilst the second and third signal conductors 10, 11 are coupled to system ground (or other reference potential $V_{ref}$). The second input $-V_{in}$ is coupled to the second and third signal conductors 10, 11 via an eighth resistance R8 which is preferably twice the resistance of the signal source 6.

The tenth apparatus 42 also includes third and fourth pick-up balancing conductors 43, 44 which are connected to the second input $-V_{in}$ on the measurement front end 7 side of the planar connector 1, and which float on the signal source 6 side of the planar connector 1. The third and fourth pick-up balancing conductors 43, 44 bracket the first signal conductor 8, and are bracketed in turn by the second and third signal conductors 10, 11 within the array of conductors 3.

The tenth apparatus 42 is optimised for immunity to interference from electrical fields, and provided that the eighth resistance R8 is equal to twice the resistance of the signal source 6, the tenth apparatus 42 should also reduce interference from electrical fields having spatial gradients. The tenth apparatus 42 will provide good performance against far field and uniform gradient time-varying magnetic fields.

The tenth apparatus 37 includes three closed loops:
1. A1-A2-S-E2-E1-A1
2. A1-A2-S-C2-C1-$R_{meas}$-R8-A1
3. E1-E2-S-C2-C1-$R_{meas}$-R8-E1

Resistances (not shown) may be placed in series with the first, second and/or third signal conductors 8, 10, 11 in order to improve resistance balancing, in a similar way to the second apparatus 16.

Figure 14:
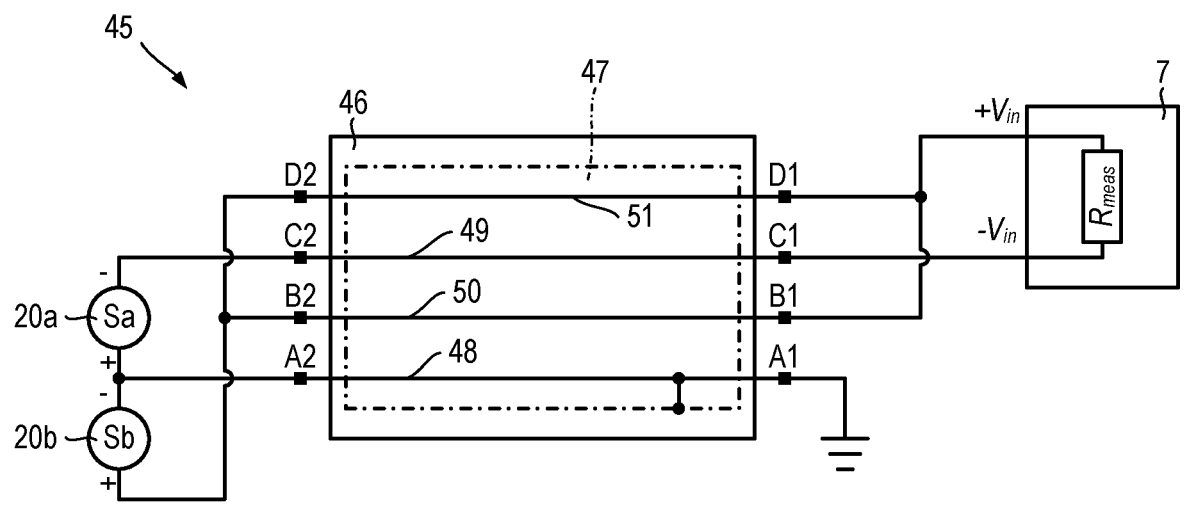
FIG. 14 schematically illustrates an eleventh apparatus.

Referring also to FIG. 14, an eleventh apparatus 45 is shown.

The eleventh apparatus 45 includes a pair of balanced signal sources 20a, 20b connected in series, connected to a measurement front end 7 using an electrostatically shielded substantially planar connector 46.

The electrostatically shielded substantially planar connector 46 (hereinafter also "electrostatically shielded planar connector 46" for brevity) is the same as the planar connector 1, except that the electrostatically shielded planar connector 46 also includes a conductive layer 47 wrapped around the conductors 3 and extending along the length L of the electrostatically shielded planar connector 46.

Referring also to FIG. 15, a cross-sectional view through an electrostatically shielded planar connector 46 is shown.

The conductive layer 47 is connected to system ground (or another reference potential $V_{ref}$), for example using a ground conductor 48 which connects a node between the balanced signal sources 20a, 20b to system ground (or another reference potential $V_{ref}$).

The grounded (or reference potential) conductive layer 47 serves to shield the conductors 3 forming the array from coupling to electric fields originating outside the electrostatically shielded planar connector 46.

A thirteenth signal conductor 49 connects the negative terminal of the balanced signal sources 20a, 20b to a second input $-V_{in}$ of the measurement front end 7. Fourteenth and fifteenth signal conductors 50, 51 connect the positive terminal of the balanced signal sources 20a, 20b to a first input $+V_{in}$ of the measurement front end 7.

The eleventh apparatus 45 includes three closed loops:
1. B1-B2-D2-D1-B1
2. B1-B2-$S_b$-$S_a$-C2-C1-$R_{meas}$-B1
3. D1-D2-$S_b$-$S_a$-C2-C1-$R_{meas}$-D1

Figure 16:
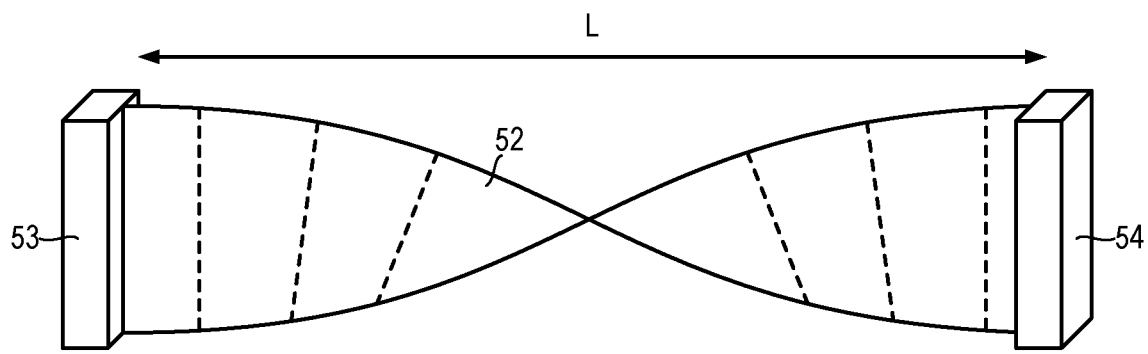
FIG. 16 schematically illustrates twisting of a substantially planar connector in the form of a flat flexible cable.

Although drawn with circular cross-sections in FIG. 16, the conductors 3 may often use other cross-sectional shapes, for example rectangular.

Referring also to FIG. 16, a planar connector 1 or electrostatically shielded planar connector 46 in the form of a flat flexible cable (FFC) 52 is shown.

The FFC 52 connects between a signal source side 53 and a measurement front end side 54, and may be used in the any of the apparatuses 2, 16, 17, 19, 25, 26, 31, 36, 37, 42, 45 described hereinbefore.

A surprising feature of FFC 52, particularly on narrow ones with only a few (e.g. fewer than ten) conductors 3 in the array, is that the plane of the FFC 52 across the conductors 3 (i.e. perpendicular to the length L of the cable) may remain relatively constant across the conductors 3 even when the FFC 52 is significantly twisted. In other words the FFC 52 may behave as string of connected straight elements perpendicular to the length L of the cable, twisting about their centre.

The same result may also hold for ribbon cables with only a few (e.g. fewer than ten) conductors 3.

The consequence of this is that the compensation for unwanted electromotive forces $+V_{emf}$, $-V_{emf}$ may be maintained even when the planar connector 1 or electrostatically shielded planar connector 46 in the form of a flat flexible cable (FFC) 52 is, for example, twisted and/or bent in use. This may be advantageous for routing connections between one or more signal sources 6 and one or more corresponding measurement front ends 7.

Figure 17:
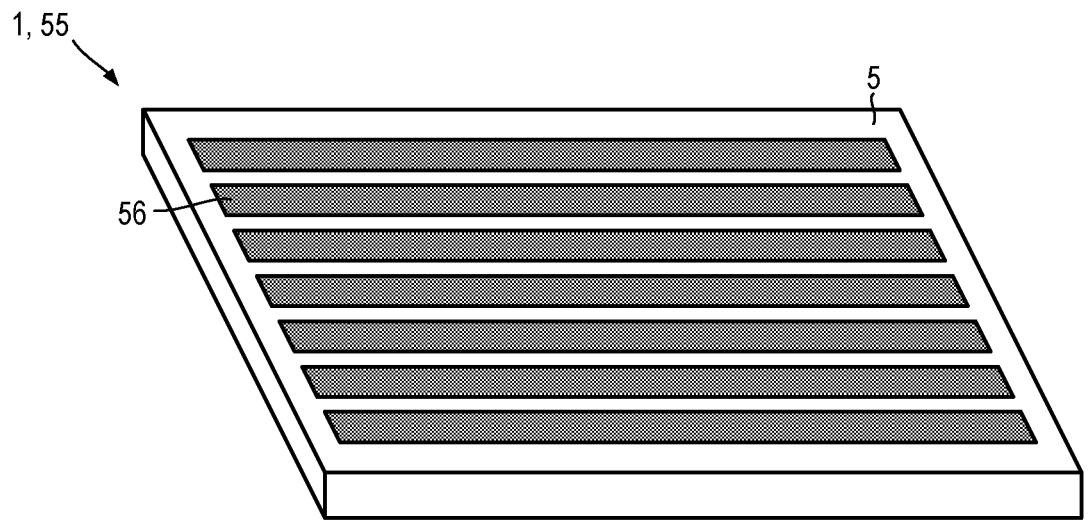
FIG. 17 is a projected view of a substantially planar connector in the form of conductive tracks supported on a substrate.

Referring also to FIG. 17, a planar connector 1, 55 in the form of a substrate 5 supporting conductors 3 in the form of conductive tracks 56 is shown.

Depending on the material of the substrate 5, the planar connector 55 may be rigid or flexible (along at least part of the length L). For example, the substrate may by a flexible printed circuit (FPC) substrate, or a conventional, rigid printed circuit board (e.g. copper-clad, resin impregnated fibres). A benefit of apparatuses 2, 16, 17, 19, 25, 26, 31, 36, 37, 42, 45 according to the present specification, when compared to alternate approaches for reducing magnetic interference on FPC or PCB's, is the removal of any requirement to 'twist' the tracks, which requires additional layers.

An electrostatically shielded planar connector 46 based on a substrate 5 may be fabricated as a multi-layer structure, for example by having a uniform shielding layer (not shown) supported on the opposite side of the substrate 5 to the conductive tracks 56, and by laminating (or depositing) an insulating layer (not shown) over the conductive tracks 56, followed by a second uniform shielding layer (not shown).

Figure 18:
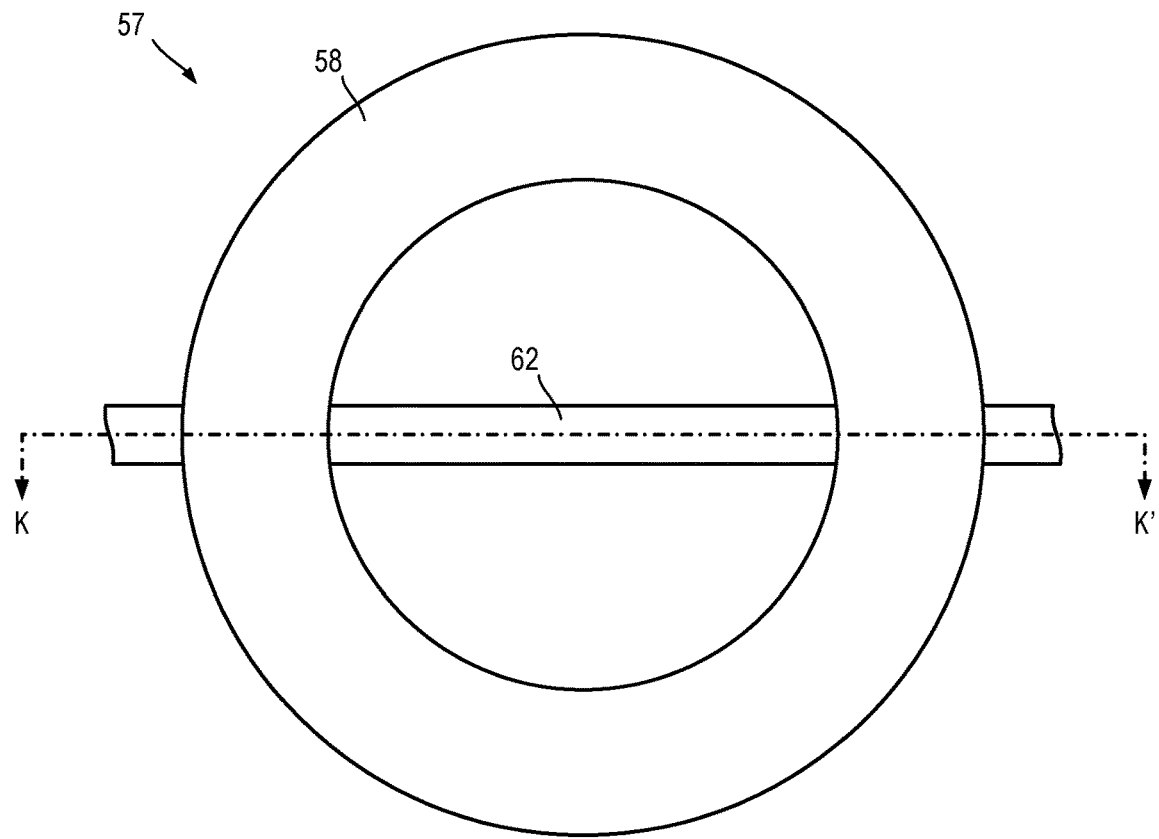
FIG. 18 is a plan view of apparatus used to evaluate the magnetic performance of substantially planar connectors and coaxial cables.

Referring also to FIG. 18, a plan view of an apparatus 57 used to evaluate the magnetic performance of planar connectors 1, 46, 55 compared to conventional co-axial cables is shown.

Figure 19:
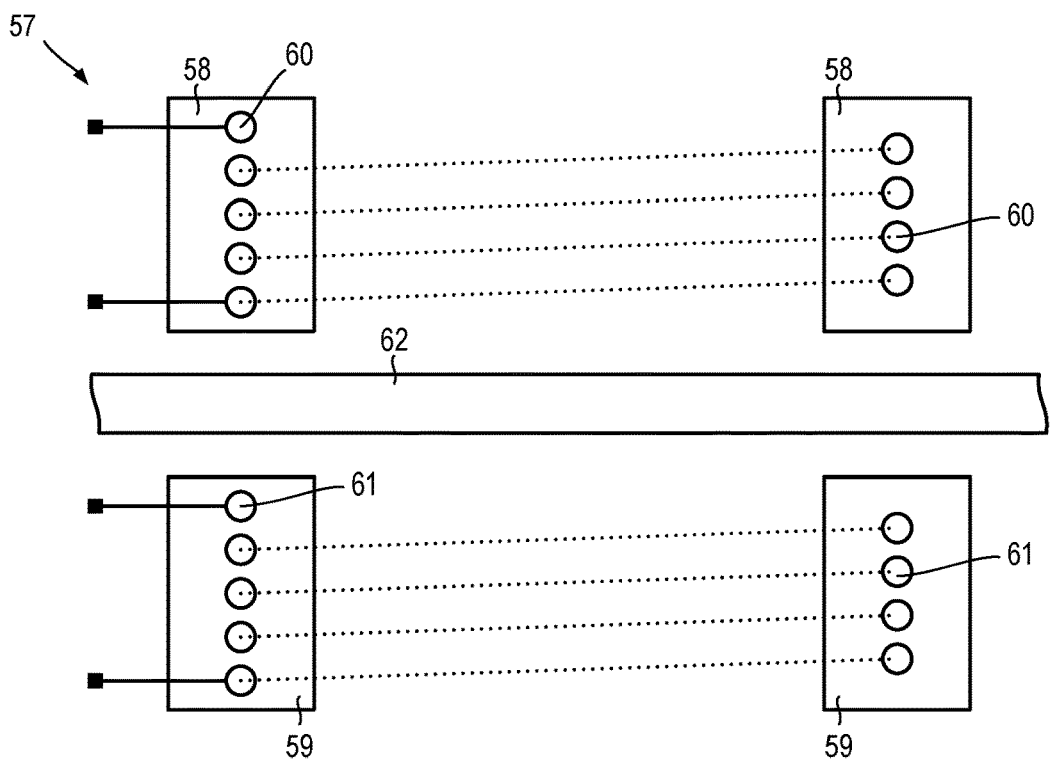
FIG. 19 is a cross section along the line labelled K-K' in FIG. 18.

Referring also to FIG. 19, a cross section along the line labelled K-K' in FIG. 18 is shown.

The apparatus 57 includes first and second Helmholtz coils 58, 59, arranged co-axially one on top of the other. The windings 60, 61 of the Helmholtz coils are in the same direction for both coils 58, 59. A test connector 62 may be placed between the first and second Helmholtz coils 58, 59, spanning across the common centre of the coils 58, 49.

Two types of samples were used as test connectors 62—planar connectors 1 in the form of flexible flat cables (FFC) configured according to the first apparatus 2, and conventional co-axial cables.

Each Helmholtz coil 58, 59 is capable of generating 1 mT root mean square (RMS) field at 60 Hz, and a signal generator was used to simulate a 100 V RMS line voltage. A measurement front 7 end configured to measure Active/Reactive power was connected to the test connectors 62. The measured power was converted to effective area and to equivalent current. Effective area herein means the area of a loop that would generate the same V(t) in the same field. Equivalent current herein means the current that the meter would report (taking into account the sensitivity of the coil) in a 70 uT field.

Referring also to FIG. 20, results obtained from a spatially uniform time-varying field are shown.

A spatially uniform field was generated between the coils 58, 59 by driving the first and second coils at 60 Hz in phase (so that the polarity of magnetic fields from each coil 58, 59 were in the same direction).

Five different samples of co-axial cable were tested and 10 different samples of planar connectors 1 in the form of flexible flat cables (FFC) configured according to the first apparatus 2 were tested. FIG. 20 plots average values of equivalent current on the left hand side axis, and the equivalent current as a % of 250 mA on the right hand side axis. Error bars represent the standard deviation of the datasets. These results are scaled according to a 200 µV/A (at 60 Hz dI/dt) sensor being used for a Current Class 20 meter of Accuracy Class 0.2 according to ANSI C12.20. This sets a maximum error of 1% at 0.25 A when a meter is exposed to a 100 A interfering field at a distance of 10 inches (0.254 m). When the FFC samples were tested a pickup voltage (corresponding to an unwanted EMF) was measured. This was converted into an equivalent current, using the known sensitivity of the current sensor (the signal source 6 in this experiment), i.e. a current which would correspond to the unwanted EMF if the unwanted EMF was actual signal from the current sensor.

It may be observed that the planar connectors 1 in the form of flexible flat cables (FFC) configured according to the first apparatus 2 performed equivalently, or slightly better, than the co-axial cables. However, the planar connectors 1 in the form of flexible flat cables (FFC) configured according to the first apparatus 2 are more compact and cheaper than co-axial cables.

Referring also to FIG. 21, results obtained from a time-varying gradient field are shown.

A gradient of 0.0243 mT/mm was generated by driving the first and second coils 58, 59 out of phase, so that the coils 58, 59 were energised in opposite directions.

Five different samples of co-axial cable were tested and 6 different samples of planar connectors 1 in the form of flexible flat cables (FFC) configured according to the first apparatus 2 were tested. FIG. 21 plots average values of equivalent current on the left hand side axis, and the equivalent current as a % of 250 mA on the right hand side axis. Error bars represent the standard deviation of the datasets.

It may be observed that to within the measured standard deviation, the planar connectors 1 in the form of flexible flat cables (FFC) configured according to the first apparatus 2 outperformed the co-axial cables.

Modifications

It will be appreciated that various modifications may be made to the embodiments hereinbefore described. Such modifications may involve equivalent and other features which are already known in the design, manufacture and use of cables for transmitting electrical signals and which may be used instead of or in addition to features already described herein. Features of one embodiment may be replaced or supplemented by features of another embodiment.

Although described with reference to the connected 1, any of the first to tenth apparatuses 2, 16, 17, 19, 25, 26, 31, 36, 37, 42 may replace the planar connector 1 with the electrostatically shielded planar connector 46.

Although examples described herein have been explained with reference to obtaining measurements of signal sources 6 whilst reducing interference from external time-varying magnetic fields, the planar connector 1, 46, 55 configurations 2, 16, 17, 19, 25, 26, 31, 36, 37, 42, 45 according to the present specification may equally be used when driving signal transmissions to reduce the generation of magnetic and electric fields which could interfere with other equipment. In this regard, the third apparatus 17 shown in FIG. 6 may be particularly useful for reducing magnetic emissions. Although the planar connector 1, 46, 55 configurations of any of the apparatuses 2, 16, 17, 19, 25, 26, 31, 36, 37, 42, 45 would reduce magnetic emissions, the third apparatus 17 is expected to perform particularly well for high frequency signals because the addition of the fourth signal conductor 18 makes the configuration both capacitively and resistively balanced.

High frequency signals may refer to a situation in which an interconnect has sufficient capacitance that keeping the roll-off the same on both terminals is important. This may also depends on the signal source impedance. For example, typical line to shield capacitances on a L=300 mm FFC may be 100 pF and a signal source 6 may have impedance in the region of 100Ω, corresponding to a break frequency of 15 MHz. In high accuracy applications, it might be necessary to match capacitances for at least a decade (of frequency) or more below the break frequency.

Alternatively, high frequency may correspond to the point at which the length L of the planar connector 1 starts to approach the wavelength of a transmitted frequency, under which circumstances it may become preferable to treat the planar connector 1 as a transmission line (with source and load matching), which would be around 50 Mhz for a L=300 mm FFC planar connector 1.

In the general, a configuration of apparatus 2, 16, 17, 19, 25, 26, 31, 36, 37, 42, 45 providing balancing of induced electromotive forces in response to an external time-varying magnetic field will also correspond to balancing of magnetic fields generated by the conductors 3 when a signal is transmitted from the signal source to a signal receiver and/or load across an equivalently configured planar connector 1, 46, 55. In this way, magnetic emissions from a planar connector 1, 46, 55 may be reduced using configurations such as those described in relation to the apparatuses 2, 16, 17, 19, 25, 26, 31, 36, 37, 42, 45 of this specification.

The apparatuses 2, 16, 17, 19, 25, 26, 31, 36, 37, 42, 45 and/or planar connectors 1, 46, 55 configured according to the present specification may be used in any application employing flexible flat cable (FFC), ribbon cable, coaxial cable, cable loom, twisted wires, twisted cables, and so forth. The apparatus 2, 16, 17, 19, 25, 26, 31, 36, 37, 42, 45 and/or planar connectors 1, 46, 55 configured according to the present specification may be used in any application involving equipment and/or systems generating, or located within, high time-varying magnetic field environments whilst also requiring transference of sensitive signals.

The apparatuses 2, 16, 17, 19, 25, 26, 31, 36, 37, 42, 45 and/or planar connectors 1, 46, 55 configured according to the present specification may be used in laptops, magnetic resonance imaging (MRI) equipment, fusion equipment, sensors located in close proximity to a motor, in electric meters, in switches or relays, in mass spectrometer equipment, in particle accelerators, in laboratory equipment, and so forth. The apparatuses 2, 16, 17, 19, 25, 26, 31, 36, 37, 42, 45 and/or planar connectors 1, 46, 55 configured according to the present specification may be used in audio equipment such as speakers, loud speakers, microphones, mixing desks, musical instruments and so forth.

Figure 22:
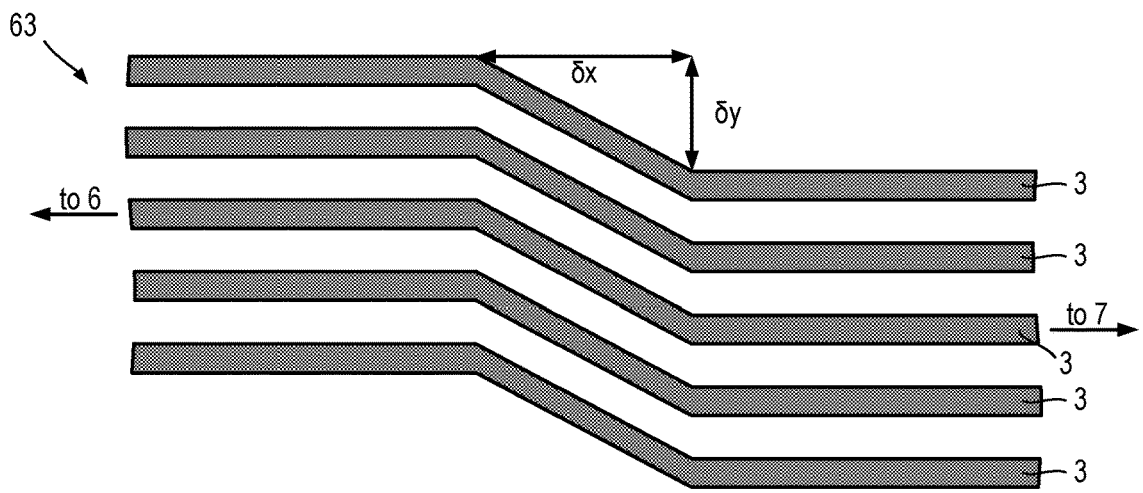
FIG. 22 schematically illustrates a portion of a substantially planar connector including an array of conductors which includes a kink.

Referring also to FIG. 22, a portion of a planar connector 63 including an array of conductors 3 which includes a kink is shown.

Across a distance δx in a first direction x, each of the conductors 3 is linearly displaced by a distance δy in a second direction y perpendicular to the first direction x. Each conductor 3 remains substantially equi-spaced from the adjacent conductors 3 before, through, and after the kink. In this way, balancing of closed-loop areas and impedances may be maintained even in planar connectors 63 in which the conductors 3 are not single, straight lines (when in an undeformed state).

The planar connector 63 may be rigid or flexible (along at least part of the length L), and when flexible may be twisted, bent, rolled or otherwise deformed. However, the support of the conductors 3 is such that substantial changes in the relationship of the conductors 3 with respect to one another within the planar connector 63 is minimised as the planar connector 63 is deformed.

Although a specific shape of kink has been illustrated, in general, any path of the conductors 3 may be used, provided that the areas between each adjacent pair of conductors 3 are substantially equal for each adjacent pair of conductors 3.

Figure 23:
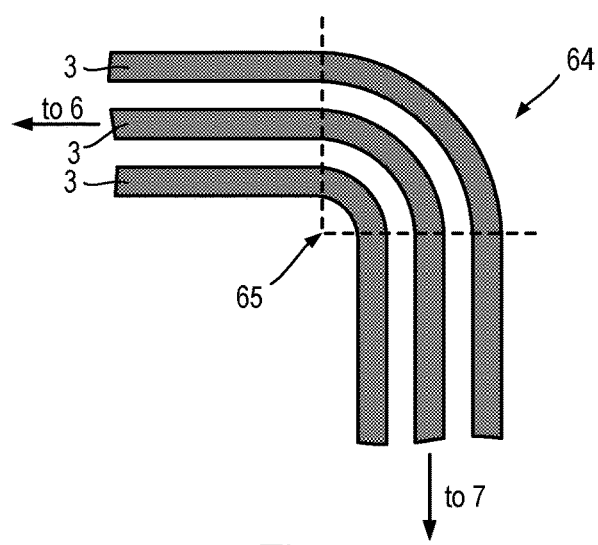
FIG. 23 schematically illustrates a portion of a substantially planar connector including an array of conductors which includes a corner.

FIG. 23 a portion of a planar connector 64 including an array of conductors 3 which includes a corner is shown.

Each of the conductors 3 follows an annular path through the corner, in this example a portion of a circle, and the annular paths have a common centre of origin 65. Although the areas between each adjacent pair of conductors 3 may be slightly different as a result of the corner, the difference may be small enough to allow adequate compensation for unwanted EMFs $+V_{emf}$, $-V_{emf}$ in some applications. In more precise applications, the area differences imparted by a corner may require compensation, for example by using matched corners (e.g. 90 degrees left followed by 90 degrees right), by slightly changing the conductor spacing to one side of a corner, or by compensating using impedance balancing using resistances placed in series, and so forth.

Although the corner has been illustrated as annular portions having a common implied origin 65, in other examples, different types of corner may be used for conductors 3, for example each conductor may simply be deflected by a given angle.

Figure 24:
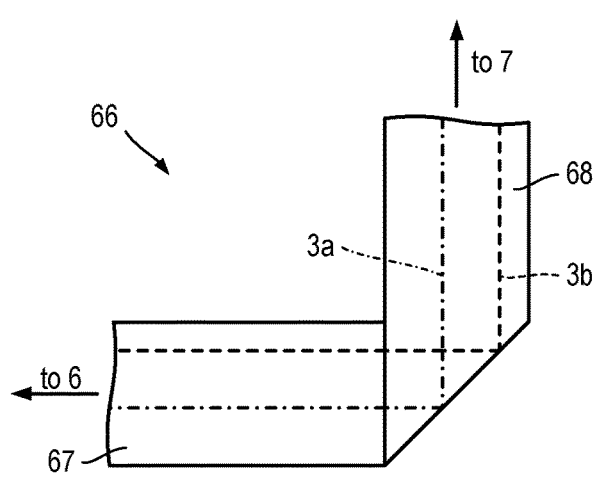
FIG. 24 schematically illustrates a substantially planar connecter in the form of a flat flexible cable (FFC) including a fold.

FIG. 24 a planar connecter 1 in the form of a flat flexible cable (FFC) 66 including a fold is shown.

The fold is sharper than, for example, a bend or twist of a planar connector 1, 46, 55, 63, 64 which may be naturally adopted when a planar connector 1, 46, 55, 63, 64 is used to connect between a signal source 6 and a measurement front end 7 oriented arbitrarily with respect to one another. Nonetheless, the relative positions of a pair of conductors 3a, 3b within the FFC 66 are maintained between a first side 67 and a second side 68 separated by the fold.

Although examples have been described in which planar connectors 1, 46, 55 have been connected between signal sources 6 and a measurement front end 7, a stand-alone planar connector (not shown) may be configured in isolation to provide improved magnetic performance. For example, a stand-alone planar connector (not shown) may a length between first and second ends (not shown) and may support a number of conductors 3 spanning between the first and second ends (not shown). As with the planar connectors 1, 46, 55, at each point between the first and second ends (not shown) the conductors 3 may be substantially equi-spaced from one another within the stand-alone connector. A first end region may correspond to a region extending from the first end of the stand-alone connector (not shown) for 10% of the length, and a second end region may correspond to a region extending from the second end of the stand-alone conductor for 10% of the length. At least a pair of the conductors 3 may be electrically connected (shorted to one another) within one or both of the first end region (not shown) and the second end region (not shown). For example, the pair of conductors 3 may be connected at one or both to the first and second ends (not shown)

A stand-alone planar connector (not shown) may take the form of a flat flexible cable, a ribbon cable or a flexible printed circuit substrate.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

The invention claimed is:

1. Apparatus comprising:
   one or more analogue signal sources;
   a measurement front end having at least first and second inputs;
   a substantially planar connector having a length between first and second ends and supporting a plurality of conductors spanning between the first and second ends, wherein at each point between the first and second ends the conductors are substantially equi-spaced from one another within the substantially planar connector, wherein the plurality of conductors comprises:
   at least one signal conductor connecting the analogue signal sources to the first input;
   at least two further conductors connecting to the one or more analogue signal sources, wherein one or both of the two further conductors also connect to the second input;
   wherein each of the at least one signal conductor and the at least two further conductors belongs to one or more closed loops, and wherein the one or more closed loops have areas and impedances configured such that in response to a uniform time-varying external magnetic field being applied to the apparatus, a first unwanted electromotive force induced at the first input will be substantially equal to a second unwanted electromotive force induced at the second input.

2. Apparatus according to claim 1, wherein the substantially planar connector further comprises an electrostatic shield layer configured to shield the at least one signal conductor and the at least two further conductors from coupling to electric fields originating outside the substantially planar connector.

3. Apparatus according to claim 1, wherein at least a portion of the substantially planar connector is flexible.

4. Apparatus according to claim 1, wherein the at least one signal conductor and the at least two further conductors at least partly define two or more closed loops, wherein at least one of the closed loops includes one of the analogue signal sources; and/or
   wherein at least one closed loop of the one or more closed loops crosses itself to form two or more sub-loops.

5. Apparatus according to claim 1, further comprising one or more resistances, each resistance connected in series with one of the at least one signal conductor and the at least two further conductors, wherein each resistance of the one or more resistances is configured to adjust the relative impedances of corresponding closed loop or loops which include that resistance, optionally wherein the resistances of the one or more resistances are larger than the resistance of the corresponding conductors.

6. Apparatus according to claim 1, wherein the one or more closed loops have areas and impedances further configured such that in response to a time-varying external magnetic field with uniform spatial gradient being applied to the apparatus or in response to a time-varying external magnetic field having a magnitude varying quadratically with spatial coordinates being applied to the apparatus, a first unwanted electromotive force induced at the first input will be substantially equal to a second unwanted electromotive force induced at the second input.

7. Apparatus according to claim 1, wherein one or more conductors of the plurality of conductors which bracket the at least one signal conductor and the at least two further conductors are connected to a ground or reference potential.

8. Apparatus according to claim 1, wherein the cancellation of electromotive forces is maintained when the substantially planar connector is twisted, folded, bent and/or otherwise deformed.

9. Apparatus according to claim 1, wherein the one of or more closed loops comprise at least one closed loop which does not include any analogue signal sources.

10. Apparatus according to claim 1, wherein the one or more analogue signal sources comprise at least one selected from a current sensor, a microphone, an ultrasonic transducer and a pick-up coil.

11. Apparatus according to claim 1, wherein the one or more analogue signal sources comprise an analogue signal source having first and second terminals;
wherein the at least one signal conductor and the at least two further conductors comprise:
a first signal conductor connecting the first input to the first terminal;
second and third signal conductors, both connecting the second input to the second terminal;
wherein the first signal conductor is between the second and third signal conductors.

12. Apparatus according to claim 11, wherein the at least one signal conductor and the at least two further conductors further comprise a fourth signal conductor connecting the first input to the first terminal;
wherein the fourth signal conductor is arranged between the second and third signal conductors.

13. Apparatus according to claim 1, wherein the one or more analogue signal sources comprise first and second balanced analogue signal sources, each having a positive terminal and a negative terminal;
wherein the at least one signal conductor and the at least two further conductors comprise:
a fifth signal conductor connecting the first input to the positive terminal of the first balanced analogue signal source;
a sixth signal conductor connecting the negative terminal of the first balanced analogue signal source to a ground or reference potential;
a seventh signal conductor connecting the second input to the negative terminal of the second balanced analogue signal source;
an eighth signal conductor connecting the positive terminal of the second balanced analogue signal source to a ground or reference potential;
wherein the fifth to eighth signal conductors belong to a single crossed closed loop.

14. Apparatus according to claim 1, wherein the one or more analogue signal sources comprise a first analogue signal source having a positive terminal and a negative terminal;
wherein the at least one signal conductor and the at least two further conductors comprise:
ninth and tenth signal conductors connecting to the positive terminal;
eleventh and twelfth signal conductors connecting to the negative terminal;
wherein ninth and tenth signal conductors are interleaved with the eleventh and twelfth signal conductors;
wherein a first weight is applied to signals from the ninth and eleventh signal conductors and a second weight is applied to signals from the tenth and twelfth signal conductors.

15. Apparatus according to claim 14, wherein;
wherein the ninth and tenth signal conductors are connected to the first input;
wherein the eleventh and twelfth signal conductors are connected to the second input;
wherein the first and second weights are applied using resistances connected between the signal conductors and the respective inputs.

16. Apparatus according to claim 14, wherein the first and second inputs correspond to a first output, and wherein the measurement front end further comprises third and fourth inputs corresponding to a second output, wherein:
the ninth signal conductor connects to the first input;
the eleventh signal conductor connects to the second input;
the tenth signal conductor connects to the third input;
the twelfth signal conductor connects to the fourth input;
wherein the apparatus is configured to calculate a weighted sum of the first and second outputs using the first and second weights respectively.

17. Apparatus comprising:
an analogue signal source having first and second terminals;
a signal receiver or load having first and second inputs;
a substantially planar connector having a length between first and second ends and supporting a plurality of conductors spanning between the first and second ends, wherein at each point between the first and second ends the conductors are substantially equi-spaced from one another within the substantially planar connector, wherein the plurality of conductors comprises:
a first signal conductor connecting the first terminal to the first input;
second and third signal conductors, both connecting the second terminal to the second input;
wherein each of the first, second and third signal conductors belong to one or more closed loops, and wherein the one or more closed loops have areas and impedances configured such that in response to a uniform time-varying external magnetic field being applied to the apparatus, a first unwanted electromotive force induced at the first input will be substantially equal to a second unwanted electromotive force induced at the second input.

18. A substantially planar connector having a length between first and second ends and supporting a plurality of conductors spanning between the first and second ends;
wherein at each point between the first and second ends the conductors are substantially equi-spaced from one another within the substantially planar connector;

wherein a first end region corresponds to a region extending from the first end for 10% of the length, and a second end region corresponds to a region extending from the second end for 10% of the length;

wherein at least a pair of the conductors are electrically connected within one or both of the first end region and the second end region.

19. A substantially planar connector according to claim 18, wherein at least one pair of conductors are electrically connected at one or both of the first end and the second end.

20. A substantially planar connector according to claim 18, wherein the substantially planar connector comprises a flat flexible cable, a ribbon cable or a flexible printed circuit substrate.

* * * * *